United States Patent [19]

Ito et al.

[11] Patent Number: 5,629,109

[45] Date of Patent: May 13, 1997

[54] NON-AQUEOUS ELECTROLYTE SECONDARY BATTERY AND METHOD FOR PRODUCING ANODE THEREFOR

[75] Inventors: Shuji Ito, Akashi; Toshihide Murata, Izumiotsu; Masaki Hasegawa, Hirakata; Yasuhiko Bito, Osaka Pref.; Yoshinori Toyoguchi, Yao, all of Japan

[73] Assignee: Matsushita Electric Industrial Co., Ltd., Osaka, Japan

[21] Appl. No.: 492,681

[22] Filed: Jun. 20, 1995

[30] Foreign Application Priority Data

Jun. 24, 1994 [JP] Japan .................................. 6-142936
May 10, 1995 [JP] Japan .................................. 7-112164

[51] Int. Cl.⁶ ...................................................... H01M 4/02
[52] U.S. Cl. ........................... 429/218; 424/213; 424/212
[58] Field of Search ................................. 429/218, 213, 429/212

[56] References Cited

U.S. PATENT DOCUMENTS

| | | | |
|---|---|---|---|
| 4,835,074 | 5/1989 | Bolster et al. | 429/43 |
| 5,294,498 | 3/1994 | Omaru et al. | 429/123 |
| 5,326,658 | 7/1994 | Takahashi et al. | 429/194 |
| 5,358,802 | 10/1994 | Mayer et al. | 429/218 |

FOREIGN PATENT DOCUMENTS 4-206274A 7/1992 Japan.
5-251080A 9/1993 Japan.

OTHER PUBLICATIONS

Solid State Ionics II; "Material Res. Symp. Proc., 1993" Voltammetric Studies of Polycarbondisulfide, Geng et al. V 293, 1993.

*Primary Examiner*—M. Nuzzolillo
*Attorney, Agent, or Firm*—Panitch Schwarze Jacobs & Nadel, P.C.

[57] ABSTRACT

A non-aqueous electrolyte secondary battery is disclosed which has an anode comprising a carbon material. The carbon material contains at least one of 7–35 wt % sulfur, 6.5–25 wt % oxygen and 10.5–18.3 wt % nitrogen, provided that if the carbon material contains at least two of these elements, the total amount of the elements does not exceed 35 wt %.

29 Claims, 15 Drawing Sheets

FIG. 4    dimethyl sulfide + chlorine
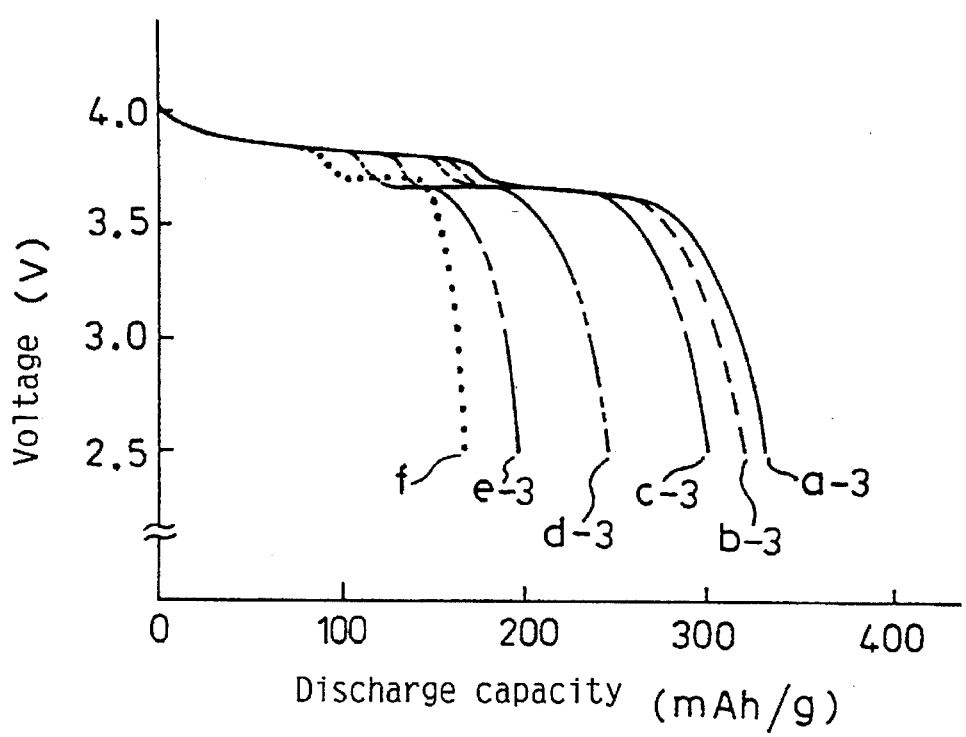
FIG. 5    polythiophene + chlorine
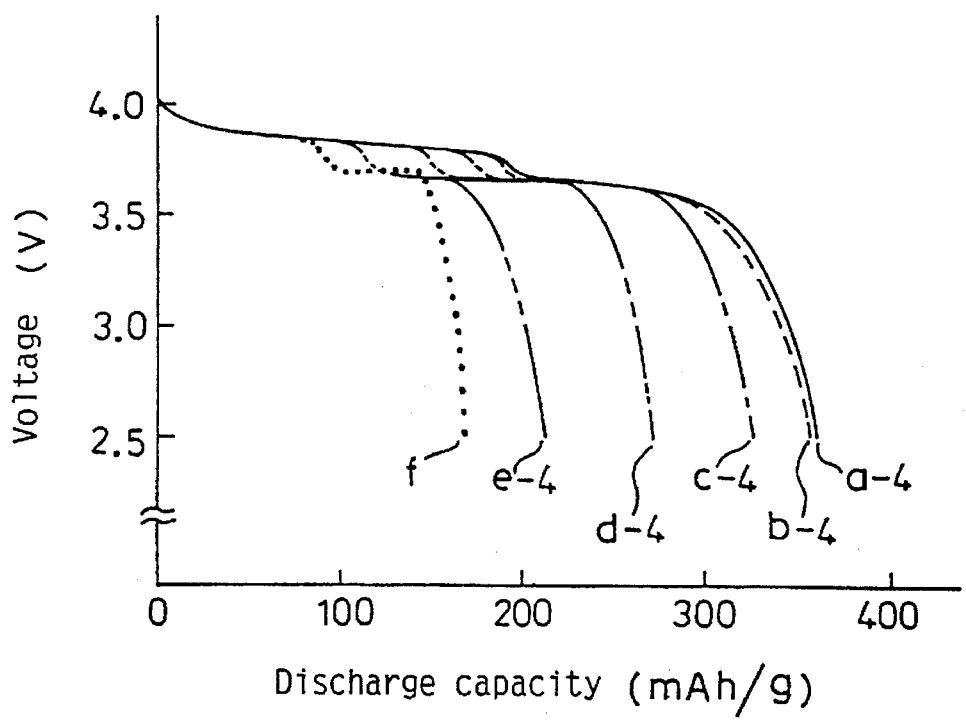

FIG. 13 dioxane + ferric chloride
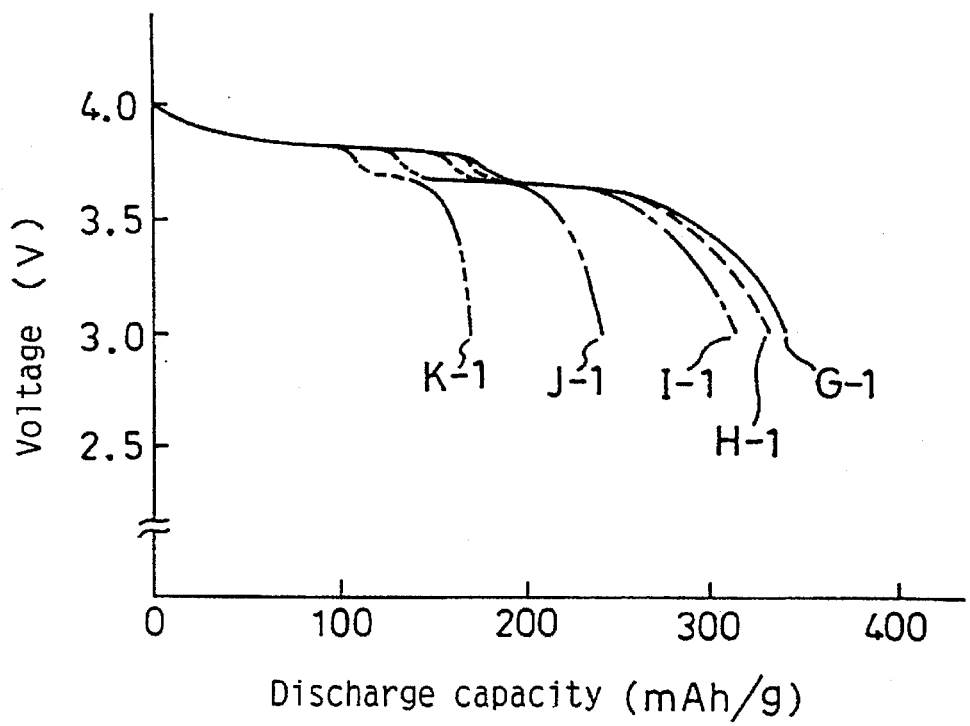
FIG. 14 polyvinyl alcohol + cupric chloride
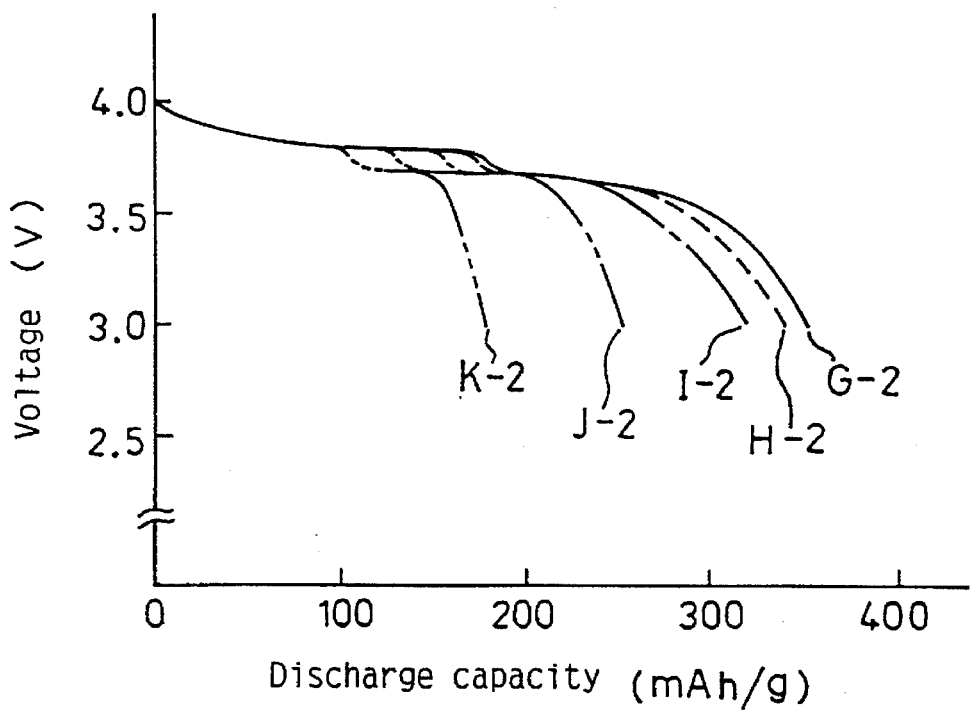

FIG. 25  piperazine + cupric chloride
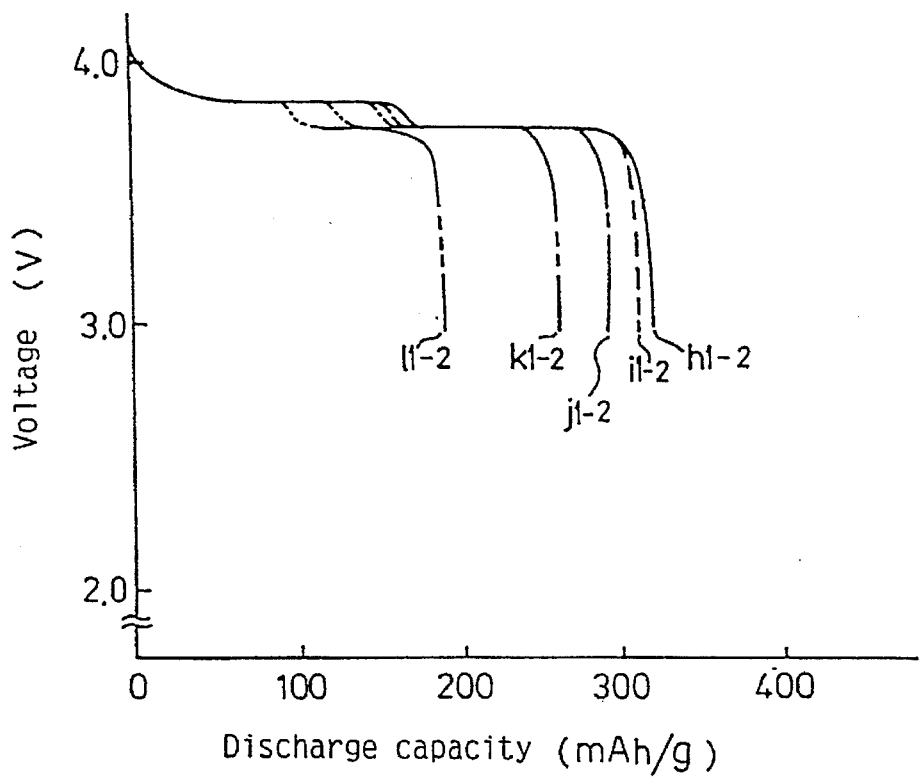
FIG. 26  acetonitrile + ferric chloride
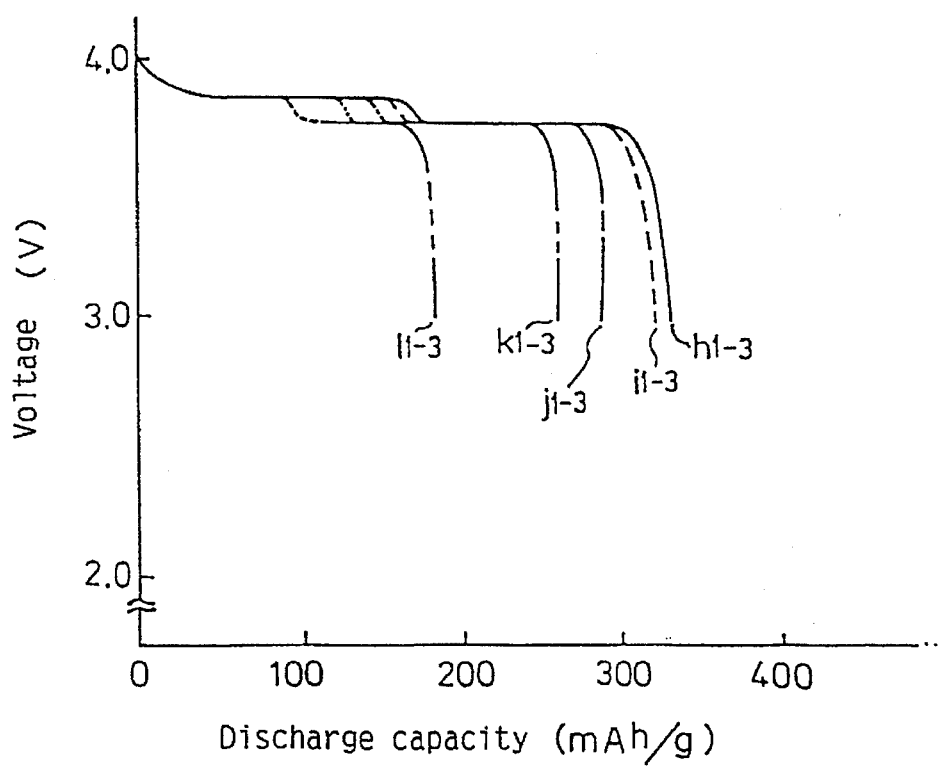

NON-AQUEOUS ELECTROLYTE SECONDARY BATTERY AND METHOD FOR PRODUCING ANODE THEREFOR

BACKGROUND OF THE INVENTION

1. Field of the Invention

The present invention relates to a non-aqueous electrolyte secondary battery and a method for producing an anode therefor. In particular, the present invention is concerned with a carbon material for constituting the anode.

2. Description of the Prior Art

The non-aqueous electrolyte secondary batteries having anodes configured with an alkali metal such as lithium and the like have a high electromotive force (EMF), and are expected to have a high energy density as compared with that of the conventional nickel-cadmium batteries or lead-acid batteries. Therefore, researches have been made increasingly to develop the batteries of this category. In particular, a number of such researches have heretofore been made on the non-aqueous electrolyte battery having an anode configured with lithium. If Li as the alkali metal is used for its anode in a metal state, dendrite formation occurs in the course of charging process of the batteries configured with Li anodes, which renders problems of short-circuiting and poor reliability in such batteries.

In order to cope with these problems, an investigation has been made on an anode configured with an alloy of lithium of alkali metal and aluminum or lead. In such alloy anode, Li is absorbed in the anode alloy in the course of charging process and no dendrite develops. Thus, a battery having a higher reliability is produced. However, the discharge potential of such alloy anode is more noble by about 0.5 V than that of metal Li, the cell voltage of the battery configured with this alloy anode is lower by 0.5 V than that of the battery configured with the metal Li anode, which results in a lower energy density.

On the other hand, researches have been made on an anode configured with an intercalation compound of carbon which contains Li atoms intercalated therein. In this compound anode, Li is intercalated between the layers of carbon by charging, whereby the dendrite formation is effectively prevented. The discharge potential of this compound anode is noble only by about 0.1 V as compared with that of metal Li anode, and therefore, the decrease in the cell voltage of the battery is small. For the above-stated reasons, this compound anode can be regarded as a more preferable anode.

This compound anode, however, has a serious disadvantage. That is, the maximum amount of Li that can be intercalated in the carbon by charging is limited to the amount corresponding to a stoichiometric amount of $C_6Li$, and in that case, the electric capacity of this compound anode amounts to 372 Ah/kg. In the charging-discharging cycle of a normal battery, the electric capacity of the anode is as small as 230 Ah/kg.

SUMMARY OF THE INVENTION

The object of the present invention is to provide a highly reliable non-aqueous electrolyte secondary battery having a higher energy density and free from short-circuiting due to the dendrite formation, for overcoming the above-mentioned disadvantages and deficiency of the prior art.

Another object of the present invention is to provide a method for producing an anode which can give such a non-aqueous electrolyte secondary battery.

The present invention provides a non-aqueous electrolyte secondary battery comprising a cathode capable of being charged and discharged, a non-aqueous electrolyte, and an anode capable of being charged and discharged, wherein the anode comprises a carbon material containing at least one member selected from the group consisting of 7–35 wt % of sulfur, 6.5–25 wt % of oxygen and 10.5–18.3 wt % of nitrogen, provided that if the carbon material contains at least two of these elements, the total amount of the elements does not exceed 35 wt %.

In one aspect of the present invention, the carbon material is the carbon residue of a thermal decomposition reaction of an organic compound containing at least one of sulfur, oxygen and nitrogen.

The method for producing an anode for a non-aqueous electrolyte secondary battery in accordance with the present invention comprises the step of heating an organic compound including at least one member selected from the group consisting of sulfur, oxygen, and nitrogen, together with at least one member selected from the group consisting of a metal halide and halogen in an inert atmosphere at 500°–1,400° C., thereby to obtain a carbon material containing at least one member selected from the group consisting of sulfur, oxygen, and nitrogen.

As the above-mentioned organic compound, a compound selected from the group consisting of a cyclic compound, a chain compound, derivatives thereof, and polymers thereof is employed.

According to the present invention, it is possible to obtain a highly reliable non-aqueous electrolyte secondary battery having a higher energy density having an excellent charge-discharge cycle characteristic, free from short-circuiting due to the dendrite formation.

While the novel features of the present invention are set forth particularly in the appended claims, the invention, both as to organization and content, will be better understood and appreciated, along with other objects and features thereof, from the following detailed description taken in conjunction with the attached drawings.

BRIEF DESCRIPTION OF THE DRAWINGS

FIG. 4 is a diagram showing discharge curves at the first cycle of batteries configured with anodes comprising carbon materials containing sulfur at various proportions.

FIG. 5 is a diagram showing discharge curves at the first cycle of batteries configured with anodes comprising carbon materials containing sulfur at various proportions.

FIG. 13 is a diagram showing discharge curves at the first cycle of batteries configured with anodes comprising carbon materials containing oxygen at various proportions.

FIG. 14 is a diagram showing discharge curves at the first cycle of batteries configured with anodes comprising carbon materials containing oxygen at various proportions.

FIG. 25 is a diagram showing discharge curves at the first cycle of batteries configured with anodes comprising carbon materials containing nitrogen at various proportions.

FIG. 26 is a diagram showing discharge curves at the first cycle of batteries configured with anodes comprising carbon materials containing nitrogen at various proportions.

DESCRIPTION OF THE PREFERRED EMBODIMENTS

Figure 1:
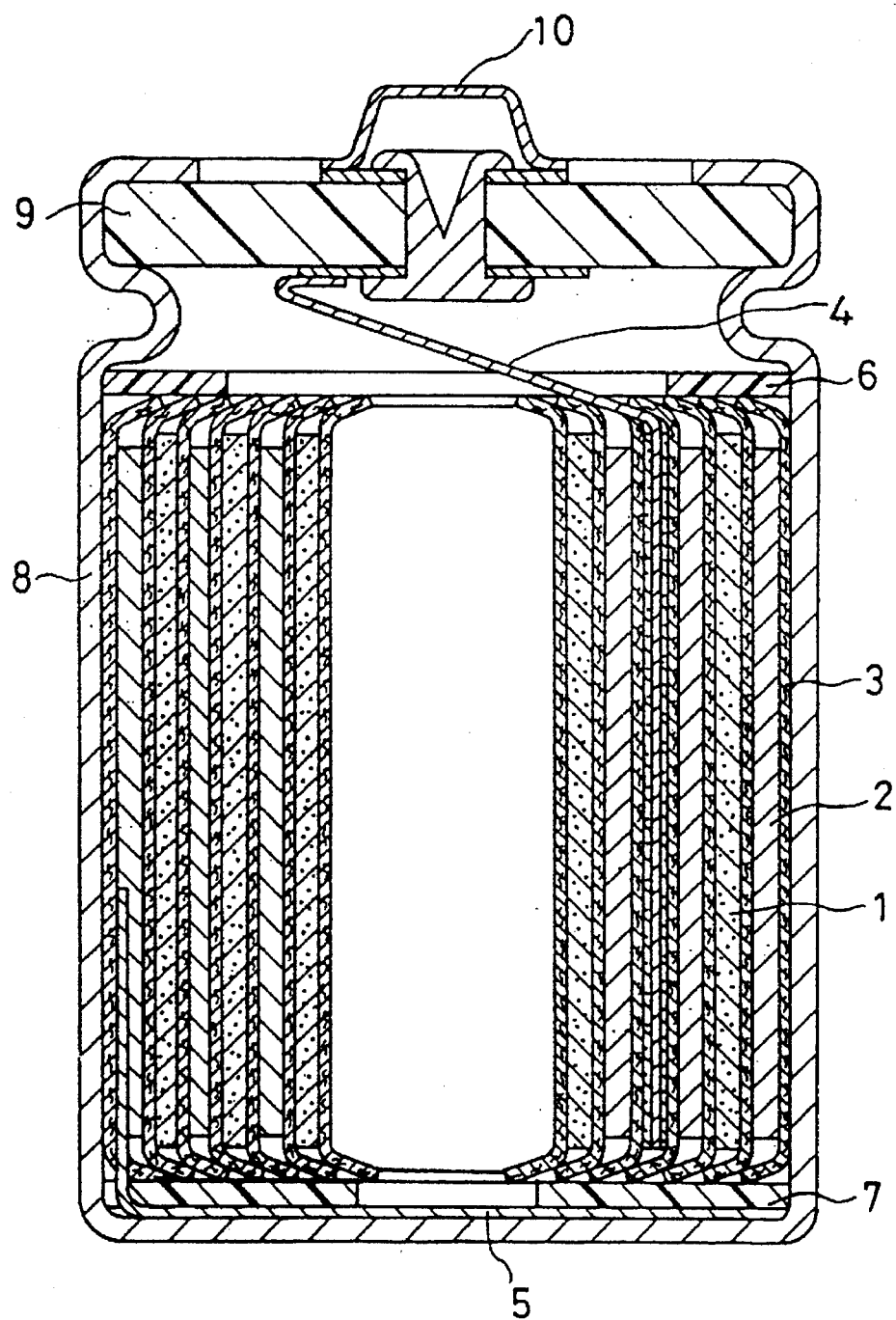
FIG. 1 is a longitudinal cross-sectional view showing a non-aqueous electrolyte secondary battery in accordance one embodiment of the present invention.
Figure 2:
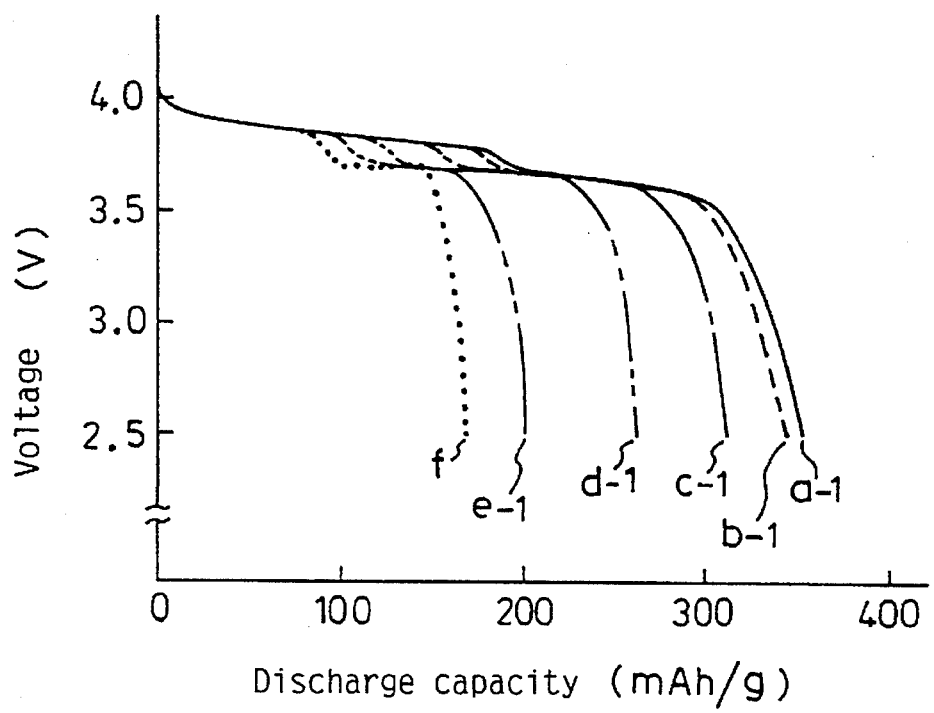
FIG. 2 is a diagram showing discharge curves at the first cycle of batteries configured with anodes comprising carbon materials containing sulfur at various proportions.
Figure 3:
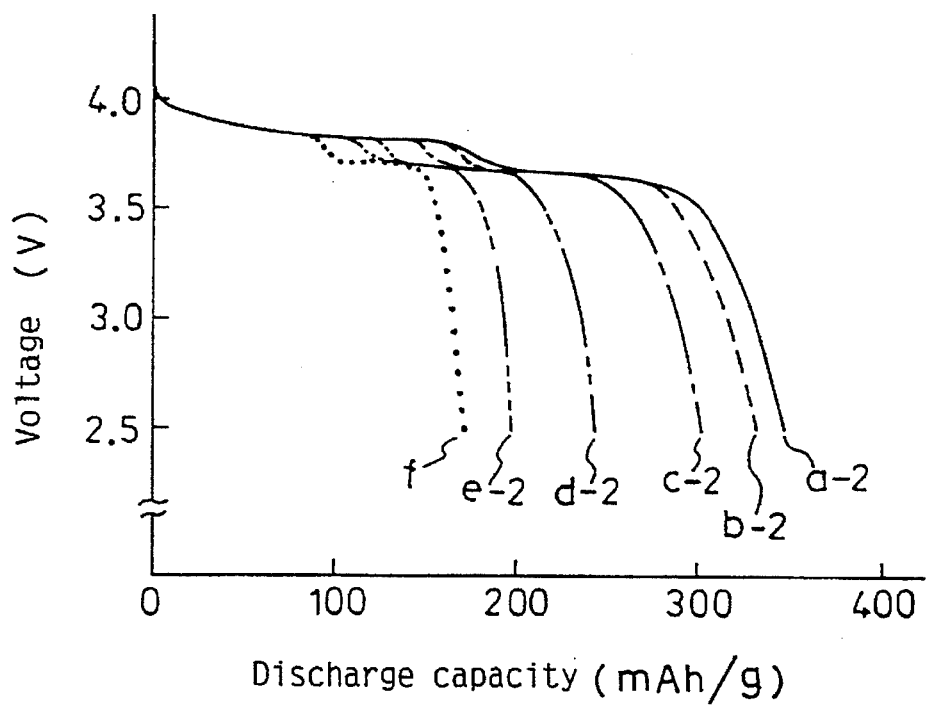
FIG. 3 is a diagram showing discharge curves at the first cycle of batteries configured with anodes comprising carbon materials containing sulfur at various proportions.

In the present study, it was found that when a carbon material containing at least one member of sulfur, oxygen or nitrogen is charged in a non-aqueous electrolyte containing an alkali metal ion such as $Li^+$, $Na^+$ or the like, the alkali metal is absorbed or intercalated in an anode in a manner similar to that of the prior art carbon anode, and when discharged, the absorbed alkali metal is released to the electrolyte in ionic state. In this manner, the alkali metal does not precipitate and a short-circuiting due to the dendrite formation will not occur.

It is considered that since the alkali metal ion absorbed or intercalated in the carbon material containing at least one member of sulfur, oxygen or nitrogen during the charging process is supplied with an electron from sulfur, oxygen or nitrogen possessing more electrons on the outermost orbit than carbon, the carbon material containing at least one member of sulfur, oxygen or nitrogen may constitute a stable compound. Therefore, the carbon material containing at least one member of sulfur, oxygen or nitrogen gives a higher capacity to an anode configured with the carbon material than that of the prior art carbon anode.

The sulfur content in the carbon material is suitably in a range of 7–35 wt %. The oxygen content in the carbon material is suitably in a range of 6.5–25 wt %, and the nitrogen content in the carbon material is suitably in a range of 10.5–18.3 wt %. If the content of sulfur, oxygen or nitrogen is less than the minimal value of the above-mentioned ranges, the capacity of the anode configured with the carbon material is small. On the contrary, if the content of sulfur, oxygen or nitrogen is more than the maximum value of the above-stated ranges, the charge-discharge cycle characteristic of the anode configured with the carbon material is deteriorated. More preferable range of sulfur is 10–35 wt %, and 15–35 wt % is most preferable. More preferable range of oxygen is 10–25 wt %, and 15–25 wt % is most preferable. Further, more preferable range of nitrogen is 13.5–18.3 wt %.

For the synthesis of the carbon material containing sulfur, it is preferable to employ, as its starting material, a heterocyclic compound containing one or more sulfur atoms such as thiophene, tetrahydrothiophene, polythiophene, thian, dithian, trithian, thiophthene, benzothiophene, thianthrene, derivatives thereof, polymers thereof, or the like.

Further, it is preferable to employ a chain compound containing one or more sulfur atoms such as methane thiol, ethane thiol, propane thiol, butane thiol, hexane thiol, heptane thiol, ethane dithiol, propane dithiol, dimethyl sulfide, diethyl sulfide, dipropyl sulfide, dimethyl disulfide, diethyl disulfide, dipropyl disulfide, derivatives thereof, polymers thereof, or the like.

For the synthesis of carbon materials containing oxygen, it is preferable to employ, as its starting material, a cyclic compound containing one or more oxygen atoms such as furan, polyfuran, tetrahydrofuran, pyran, dioxane, trioxane, dioxolan, oxolan, benzofuran, butyrolactone, chromene, chroman, benzoquinone, naphthol, naphthoquinone, phenol, phenolic resin, derivatives thereof, polymers thereof, or the like.

Further, it is preferable to employ a chain compound containing one or more oxygen atoms such as polyethers of polyethylene oxide, polypropylene oxide or the like, polyesters of polyethylene terephthalate, alkyd resin, maleic acid resin or the like, a polymer or copolymer of polyvinyl alcohol, alcohols such as ethanol or the like, aldehydes of acetoaldehyde or the like, or carboxylic acids such as acetic acid or the like.

For the synthesis of carbon materials containing nitrogen, it is preferable to employ, as its starting material, a cyclic compound containing one or more nitrogen atoms such as aniline or the like, or derivatives thereof, or polymers thereof, and a heterocyclic compound containing one or more nitrogen atoms such as pyrrole, polypyrrole, piperazine, pyrazine, pyrazole, triazine, triazole, quinoline, tetrahydroquinone, melamine, derivatives thereof, polymers thereof, or the like.

Further, it is preferable to employ a chain compound containing one or more nitrogen atoms such as dimethyl formamide, a chain nitrile or its derivative represented by acetonitrile, acrylonitrile, propionitrile, butyronitrile, pentanonitrile, polyacrylonitrile or its copolymerized product, or the like.

When heated, halogen or halide reacts with hydrogen in these compounds and releases hydrogen as a hydrogen halide, and thus has a function of preventing escape of sulfur, oxygen or nitrogen from the raw material. As the halogen, chlorine is preferable. As the halide, cupric or cuprous chloride, ferric or ferrous chloride, a nickel chloride and a palladium chloride are preferable.

In view of the capacity and the charge-discharge cycle performance, the heating temperature is preferably in a range of 500° C.–1400° C. If the temperature is lower than the above-mentioned range, the synthesis reaction does not proceed sufficiently. On the contrary, if the reaction temperature is higher than the above-mentioned range, sulfur, oxygen or nitrogen tends to be released from the carbon material, resulting in a decrease of the capacity of the anode configured with the obtained carbon material. A more preferable range of the heating temperature is 600°–1,000° C.

In the following paragraphs, the present invention will be described in more detail by way of examples with reference to the attached drawings.

EXAMPLE 1

In this example, a carbon material containing sulfur was synthesized in a reaction vessel by heating the starting material of thiophene or polythiophene which is a heterocyclic compound containing one or more sulfur atoms with chlorine, or methane thiol or dimethyl sulfide which is a chain compound containing a sulfur atom with chlorine, and the characteristic of thus obtained carbon material as an anode was investigated.

Further, as a comparative example, thermally decomposed or pyrolyzed carbon was obtained by introducing only benzene into a reaction tube, and was investigated in a similar manner.

First, the carbon material containing sulfur was synthesized in the following manner.

As the reaction vessel, a quartz tube was used. The reaction temperature was fixed at 900° C. After evacuating the reaction tube, the inside pressure of the reaction tube was returned to atmospheric pressure with nitrogen. Then, each of the starting materials of various proportions was introduced into the reaction tube, thereby to synthesize each of the carbon materials containing sulfur at various proportions as listed in Tables 1–4 below. In this process, thiophene, methane thiol and dimethyl sulfide were vaporized by heating and the resultant vaporized gases were introduced into the reaction tube using nitrogen as the carrier gas. In case of polythiophene, polythiphene was placed in the center of the reaction tube before introduction of chlorine.

TABLE 1

| Sulfur Content | Supply Amount (mole/hour) | |
| --- | --- | --- |
| (wt %) | thiophene | chlorine |
| 45 | 0.022 | 0.100 |
| 35 | 0.042 | 0.100 |
| 15 | 0.153 | 0.100 |
| 7 | 0.352 | 0.100 |
| 4 | 0.654 | 0.100 |

TABLE 2

| Sulfur Content | Supply Amount (mole/hour) | |
| --- | --- | --- |
| (wt %) | methane thiol | chlorine |
| 45 | 0.015 | 0.05 |
| 35 | 0.020 | 0.05 |
| 15 | 0.078 | 0.05 |
| 7 | 0.176 | 0.05 |
| 4 | 0.350 | 0.05 |

TABLE 3

| Sulfur Content | Supply Amount (mole/hour) | |
| --- | --- | --- |
| (wt %) | dimethyl sulfide | chlorine |
| 45 | 0.015 | 0.07 |
| 35 | 0.020 | 0.07 |
| 15 | 0.077 | 0.07 |
| 7 | 0.177 | 0.07 |
| 4 | 0.338 | 0.07 |

TABLE 4

| Sulfur Content | Supply Amount (mole/hour) | |
| --- | --- | --- |
| (wt %) | polythiophene | chlorine |
| 45 | 0.043 | 0.100 |
| 35 | 0.062 | 0.100 |
| 15 | 0.225 | 0.100 |
| 7 | 0.526 | 0.100 |
| 4 | 0.984 | 0.100 |

Next, an anode plate was prepared as follows: after adding 10 g of polyvinylidene fluoride as a binder to 100 g of one of the sulfur containing carbon powders obtained in the above-mentioned manner, the resultant mixture was made into a paste by the use of dimethyl formamide, and then thus obtained paste was coated on a core material of nickel, and dried and rolled.

A cathode plate, on the other hand, was prepared as follows: after adding 10 g of carbon powder as the electrically conductive agent and 5 g of polyvinylidene fluoride as the binder to 100 g of $LiMn_2O_4$ as the cathode active material, the resultant mixture was made into a paste by the use of dimethyl formamide, and then thus obtained paste was coated on a core material of titanium, and dried and rolled.

Then, an electrode assembly was configured by rolling up the above-mentioned anode plate together with the cathode plate and a separator made of porous propylene film, with the separator being interposed between the two electrodes to provide a spiral roll of electrodes. This spiral roll of electrodes was then assembled into a battery as shown in FIG. 1.

In FIG. 1, numeral 1 designates the cathode plate, numeral 2 the anode plate and numeral 3 the separator, respectively. The cathode plate 1 and the anode plate 2, respectively, have lead conductors 4 and 5 comprising the same materials as the core materials of the respective electrode plates. The spirally rolled-up electrode assembly is inserted in a vessel 8 with electrically insulating disks 6 and 7 made of polypropylene disposed on its top and bottom. After placing the electrode assembly in the vessel 8, which is then roll-grooved at its shoulder part, a non-aqueous electrolyte comprising propylene carbonate which dissolves lithium perchlorate ($LiClO_4$) by 1 mole/l is injected into the vessel. The vessel 8 is sealed with a sealing disk 9 of synthetic resin provided with a cathode terminal 10 by roll-caulking.

By employing the pyrolyzed carbon obtained from benzene of the comparative example, another anode was prepared similarly, and a battery was configured with this anode.

Batteries configured with the anodes of carbons each having a sulfur content of 4 wt %, 7 wt %, 15 wt %, 35 wt %, and 45 wt % are named "a", "b", "c", "d", and "e", respectively. Further, a battery configured with the anode of the pyrolyzed carbon is named "f". These batteries have a larger electric capacity in the cathode. The capacity of the batteries is determined by the capacity of the respective anodes.

Charge-discharge cycles were repeated for each of the batteries by charging it at a constant current of 0.5 mA/cm$^2$ up to 4.4 V and discharging it as low as 2.5 V. FIG. 2 through FIG. 5 each show the discharge curve at the first cycle. Further, Table 5 through Table 8 below each list the discharge capacity at the first cycle and the discharge capacity at the 500th cycle, as well as the maintenance rate of the discharge capacity at the 500th cycle to the first cycle. In each table, the discharge capacity represents the capacity for 1 g of the carbon anode containing sulfur or the pyrolyzed carbon anode (comparative example).

TABLE 5 thiophen + chlorine (Present Invention)

| Sulfur Content (wt %) | Discharge capacity at first cycle (mAh/g) | Discharge capacity at 500th cycle (mAh/g) (capacity maintenance rate (%)) |
|---|---|---|
| 45 | 350 | 186 (53) |
| 35 | 343 | 254 (74) |
| 15 | 311 | 250 (80) |
| 7 | 260 | 234 (90) |
| 4 | 201 | 191 (95) |
| C (Comparative Example) | 170 | 165 (97) |

TABLE 6 methane thiol + chlorine (Present Invention)

| Sulfur Content (wt %) | Discharge capacity at first cycle (mAh/g) | Discharge capacity at 500th cycle (mAh/g) (capacity maintenance rate (%)) |
|---|---|---|
| 45 | 345 | 172 (50) |
| 35 | 330 | 254 (77) |
| 15 | 302 | 248 (82) |
| 7 | 243 | 221 (91) |
| 4 | 195 | 185 (95) |
| C (Comparative Example) | 170 | 165 (97) |

TABLE 7 dimethyl sulfide + chlorine (Present Invention)

| Sulfur Content (wt %) | Discharge capacity at first cycle (mAh/g) | Discharge capacity at 500th cycle (mAh/g) (capacity maintenance rate (%)) |
|---|---|---|
| 45 | 330 | 168 (51) |
| 35 | 321 | 244 (76) |
| 15 | 300 | 249 (83) |
| 7 | 245 | 218 (89) |
| 4 | 193 | 181 (94) |
| C (Comparative Example) | 170 | 165 (97) |

TABLE 8 polythiophene + chlorine (Present Invention)

| Sulfur Content (wt %) | Discharge capacity at first cycle (mAh/g) | Discharge capacity at 500th cycle (mAh/g) (capacity maintenance rate (%)) |
|---|---|---|
| 45 | 361 | 180 (50) |
| 35 | 358 | 286 (80) |
| 15 | 324 | 275 (85) |
| 7 | 270 | 248 (92) |
| 4 | 215 | 206 (96) |
| C (Comparative Example) | 170 | 165 (97) |

As clearly shown in these tables, each of the initial discharge capacities of the batteries configured with the anodes of the carbon materials containing sulfur is large as compared with that of the battery configured with the anode of the pyrolyzed carbon obtained from benzene. Furthermore, the initial capacity increases with the increase in the sulfur content in each of the batteries. On the other hand, the capacity maintenance rate decreases with the increase in the sulfur content.

The carbon anode containing sulfur by only 4 wt %, which is not sufficiently large, showed a capacity and a capacity maintenance rate substantially equivalent to those of the pyrolyzed carbon anode.

In view of the capacity and the charge-discharge performance required for a secondary battery, it is concluded that an electrode configured with the carbon material containing sulfur by 7–35 wt % is excellent as an anode for a non-aqueous electrolyte secondary battery.

EXAMPLE 2

In this example, a carbon material containing sulfur was synthesized in a reaction vessel by heating the starting material of dithian, which is a heterocyclic compound containing two sulfur atoms with cupric chloride, or ethane thiol, which is a chain compound containing a sulfur atom with ferric chloride.

The method for synthesizing the carbon material containing sulfur was similar to that of Example 1, except that cupric chloride and ferric chloride was introduced into the central part of the reaction tube in advance. Further, in cases of dithian and ethane thiol, they were heated to vaporize in advance and the vaporized gases were introduced into the reaction tube by using nitrogen as the carrier gas. Moreover, in case of cuptic chloride, the produced carbon material containing sulfur was deposited on the surface of the cupric chloride in a molten state.

On the other hand, the ferric chloride was vaporized and allowed to react with ethane thiol in a gas phase. In either case, only the produced carbon material containing sulfur was separated from the reaction mixture for configuring the anode. Each of Table 9 and Table 10 below lists the respective supplying proportion of dithian and cupric chloride of raw materials and the sulfur content in the produced carbon material.

TABLE 9

| Sulfur Content | Supply Amount (mole/hour) | |
|---|---|---|
| (wt %) | dithian | cupric chloride |
| 45 | 0.032 | 0.20 |
| 35 | 0.050 | 0.20 |
| 15 | 0.188 | 0.20 |
| 7 | 0.439 | 0.20 |
| 4 | 0.803 | 0.20 |

TABLE 10

| Sulfur Content | Supply Amount (mole/hour) | |
|---|---|---|
| (wt %) | ethane thiol | ferric chloride |
| 45 | 0.063 | 0.30 |
| 35 | 0.080 | 0.30 |
| 15 | 0.304 | 0.30 |
| 7 | 0.704 | 0.30 |
| 4 | 1.282 | 0.30 |

By employing each of the synthesized carbon materials, a secondary battery was configured in a manner similar to that of Example 1, and the capacity and the charge-discharge performance were investigated.

Batteries configured with the anodes of the carbons each having a sulfur content of 4 wt %, 7 wt %, 15 wt %, 35 wt %, and 45 wt % are named "g", "h", "i", "j", and "k", respectively.

Figure 6:
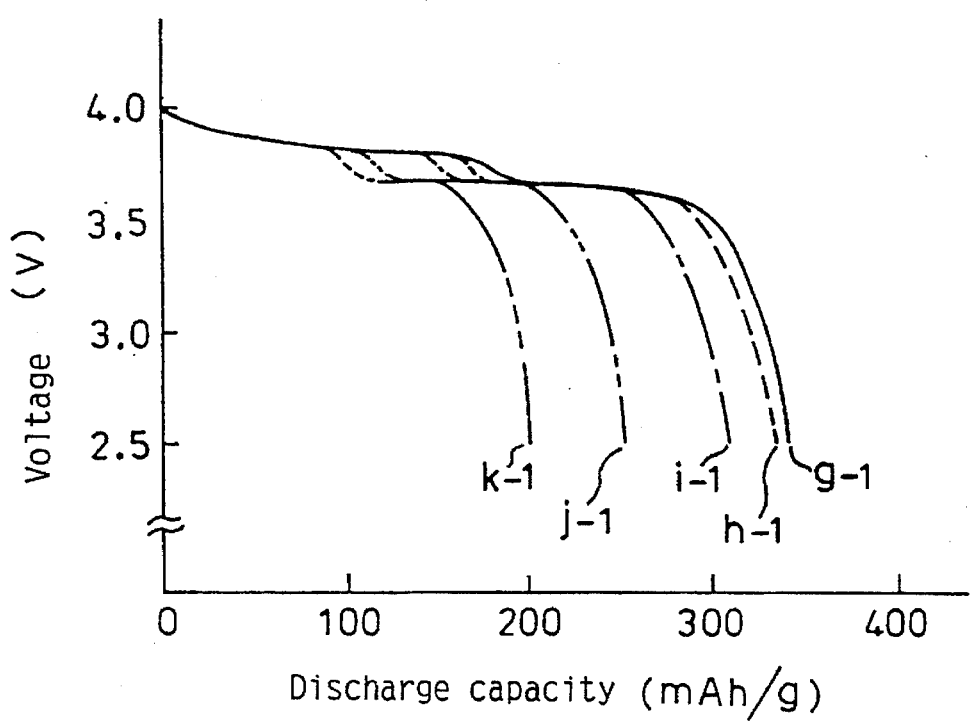
FIG. 6 is a diagram showing discharge curves at the first cycle of batteries configured with anodes comprising carbon materials containing sulfur at various proportions.
Figure 7:
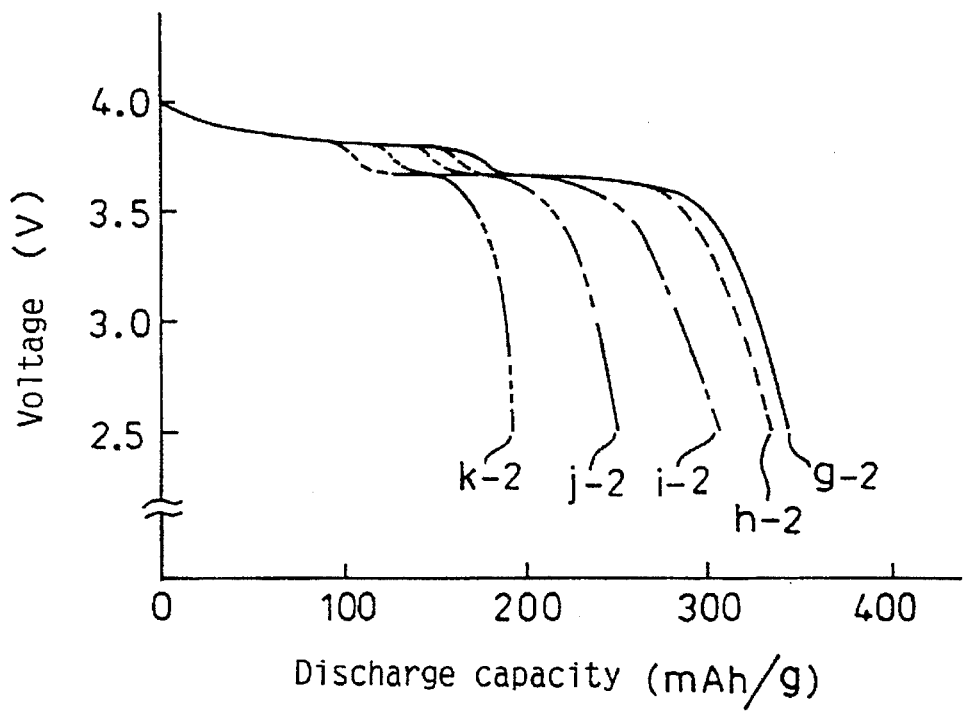
FIG. 7 is a diagram showing discharge curves at the first cycle of batteries configured with anodes comprising carbon materials containing sulfur at various proportions.

Charge-discharge cycles were repeated for each of the batteries by charging it at a constant current of 0.5 mA/cm$^2$ up to 4.4 V and discharging it as low as 2.5 V. FIG. 6 and FIG. 7 each show the discharge curve at the first cycle. Further, Table 11 and Table 12 below list the discharge capacity at the first cycle and the discharge capacity at the 500th cycle, as well as the maintenance rate of the discharge capacity at the 500th cycle to the first cycle. In each table, the discharge capacity represents the capacity for 1 g of the carbon anode containing sulfur.

TABLE 11

| | cupric chloride + chlorine (Present Invention) | |
|---|---|---|
| Sulfur Content (wt %) | Discharge capacity at first cycle (mAh/g) | Discharge capacity at 500th cycle (mAh/g) (capacity maintenance rate (%)) |
| 45 | 340 | 177 (52) |
| 35 | 334 | 251 (75) |
| 15 | 307 | 252 (82) |
| 7 | 253 | 225 (89) |
| 4 | 198 | 186 (94) |

TABLE 12

| | ethane thiol + ferric chloride (Present Invention) | |
|---|---|---|
| Sulfur Content (wt %) | Discharge capacity at first cycle (mAh/g) | Discharge capacity at 500th cycle (mAh/g) (capacity maintenance rate (%)) |
| 45 | 343 | 175 (51) |
| 35 | 335 | 251 (75) |
| 15 | 309 | 247 (80) |
| 7 | 250 | 215 (86) |
| 4 | 193 | 179 (93) |

As clearly shown in these tables, the initial discharge capacity increases with the increase in the sulfur content in each battery. On the other hand, the capacity maintenance rate decreases with the increase in the sulfur content.

The carbon anode containing sulfur by only 4 wt %, which is not sufficiently large, showed a capacity and a capacity maintenance rate substantially equivalent to those of the pyrolyzed carbon anode.

In view of the capacity and the charge-discharge performance required for a secondary battery, it is concluded that an electrode configured with the carbon material containing sulfur by 7–35 wt % is excellent as an anode for a non-aqueous electrolyte secondary battery.

EXAMPLE 3

While Li was used as an alkali metal to be intercalated in Example 1 and Example 2, sodium was used in this example. For the anodes of this example, carbon materials each having a sulfur content of 4 wt %, 7 wt %, 15 wt %, 35 wt %, and 45 wt % synthesized from polythiophene and chlorine of Example 1 were used. The procedure identical to that of Example 1 was followed except for the use of NaNiO$_2$ as the cathode active material and propylene carbonate which dissolved sodium perchlorate (NaClO$_4$) by 1 mole/l as the non-aqueous electrolyte.

By employing the pyrolyzed carbon obtained from benzene of the comparative example, another anode was prepared similarly, and a battery was configured with this anode.

Batteries configured with the anodes of the carbons each having a sulfur content of 4 wt %, 7 wt %, 15 wt %, 35 wt %, and 45 wt % are named "l", "m", "n", "o", and "p", respectively. Further, a battery configured with the anode of the pyrolyzed carbon is named "q". These batteries have a larger electric capacity in their cathode. The capacity of each of the batteries is determined by the capacity of the anodes.

Figure 8:
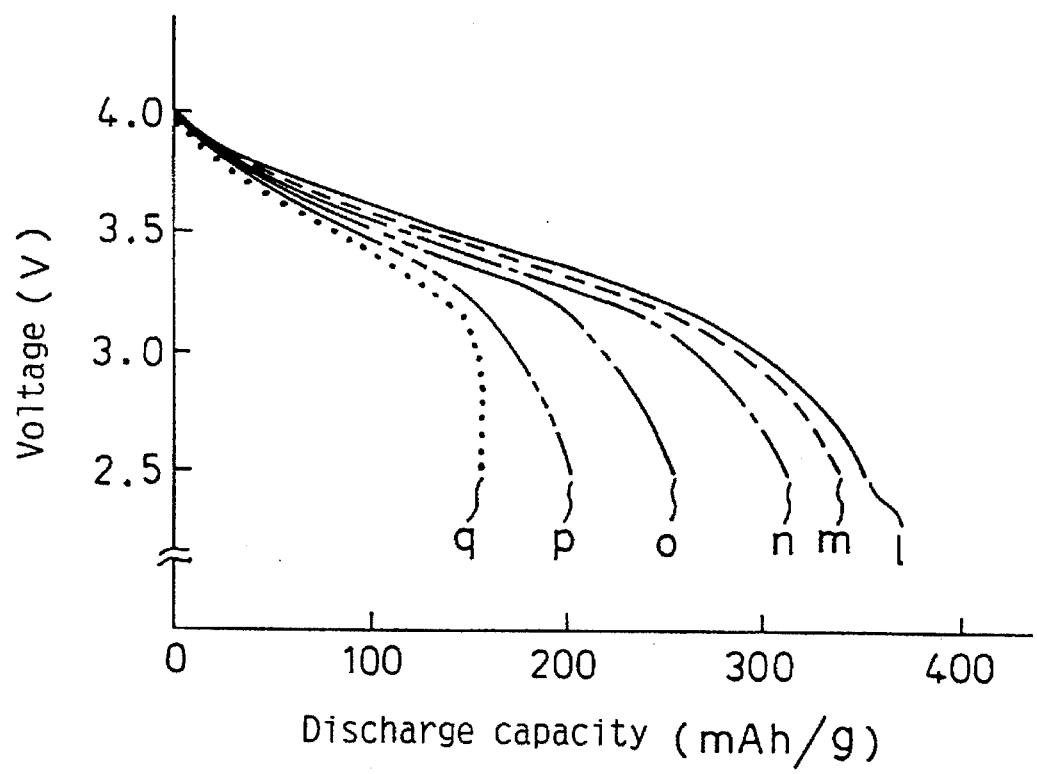
FIG. 8 is a diagram showing discharge curves at the first cycle of batteries configured with anodes comprising carbon materials containing sulfur at various proportions.
Figure 9:
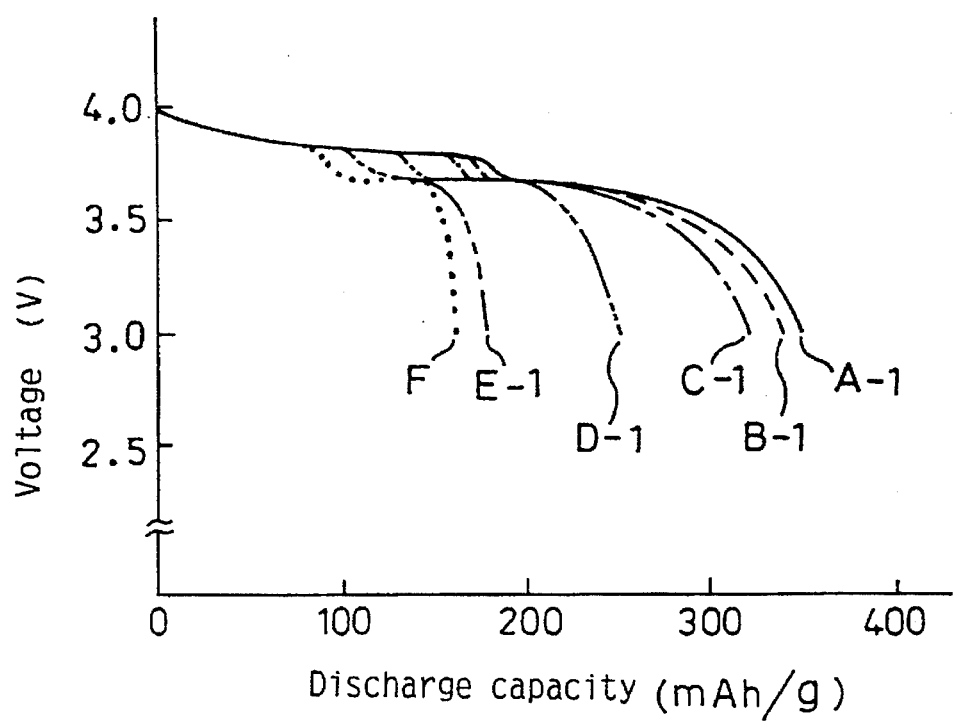
FIG. 9 is a diagram showing discharge curves at the first cycle of batteries configured with anodes comprising carbon materials containing oxygen at various proportions.
Figure 10:
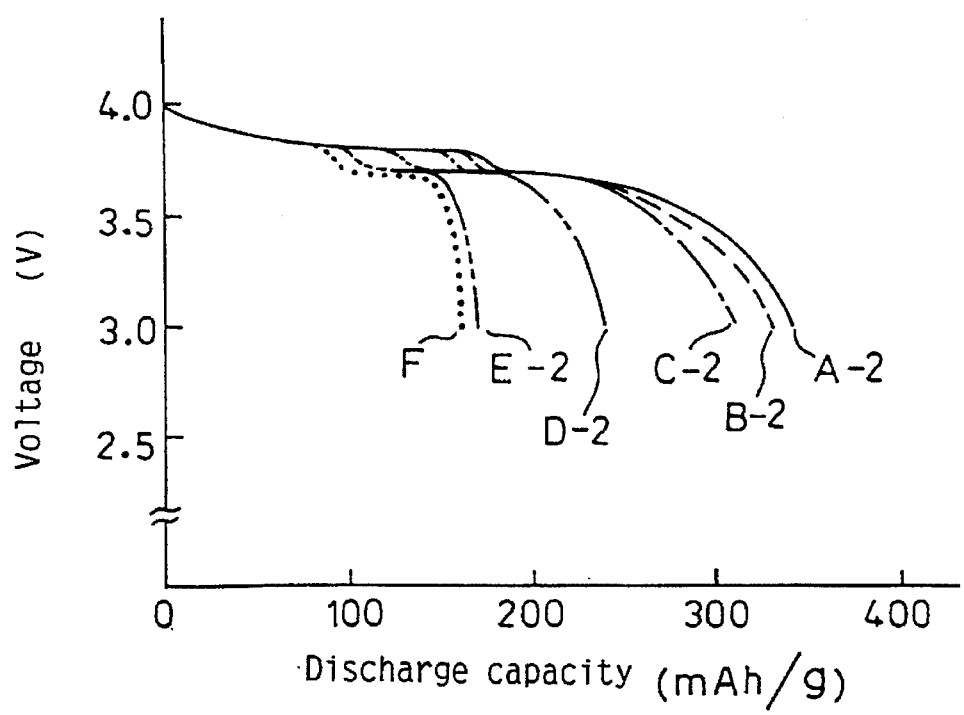
FIG. 10 is a diagram showing discharge curves at the first cycle of batteries configured with anodes comprising carbon materials containing oxygen at various proportions.
Figure 11:
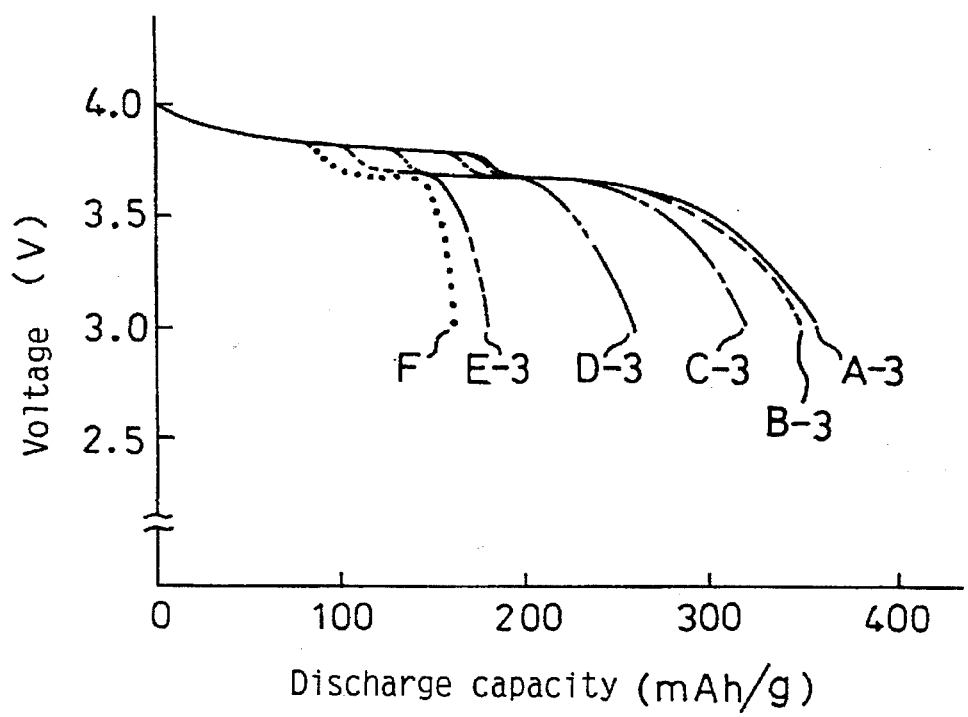
FIG. 11 is a diagram showing discharge curves at the first cycle of batteries configured with anodes comprising carbon materials containing oxygen at various proportions.
Figure 12:
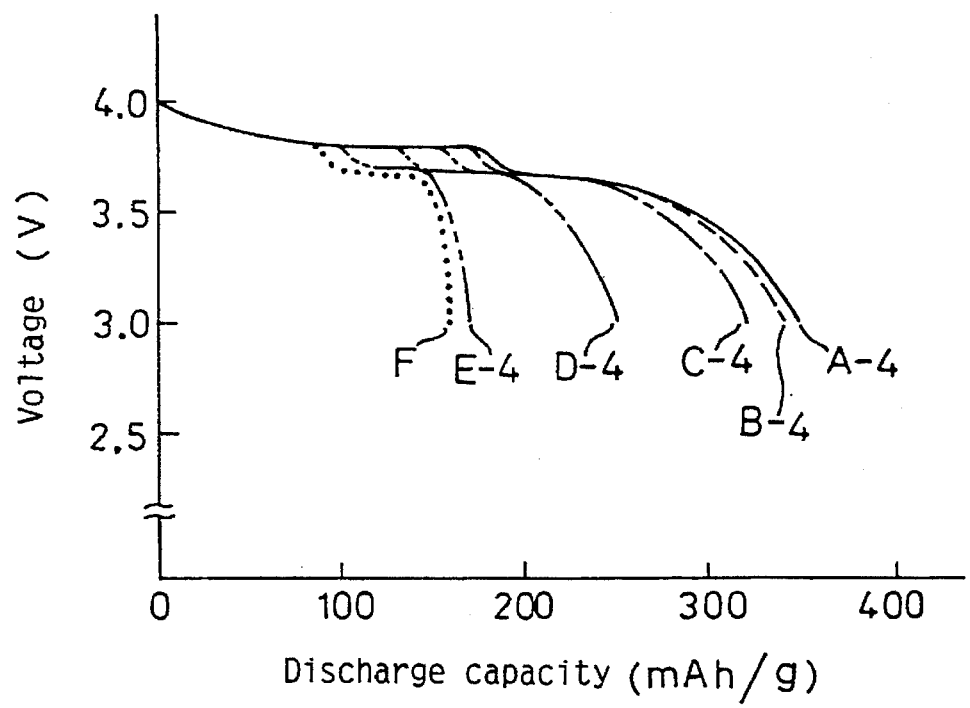
FIG. 12 is a diagram showing discharge curves at the first cycle of batteries configured with anodes comprising carbon materials containing oxygen at various proportions.

Charge-discharge cycles were repeated for each of the batteries by charging it at a constant current of 0.5 mA/cm$^2$ up to 4.0 V and discharging it as low as 2.5 V. FIG. 8 shows the discharge curve at the first cycle. Further, Table 13 below lists the discharge capacity at the first cycle and the discharge capacity at the 500th cycle, as well as the maintenance rate of the discharge capacity at the 500th cycle to the first cycle.

TABLE 13

| | polythiophene + chlorine (Present Invention) | |
| --- | --- | --- |
| Sulfur Content (wt %) | Discharge capacity at first cycle (mAh/g) | Discharge capacity at 500th cycle (mAh/g) (capacity maintenance rate (%)) |
| 45 | 349 | 181 (52) |
| 35 | 343 | 264 (77) |
| 15 | 307 | 246 (80) |
| 7 | 254 | 218 (86) |
| 4 | 198 | 182 (92) |
| C (Comparative Example) | 152 | 143 (94) |

As clearly shown in the table, the initial discharge capacity of the batteries configured with the anodes of the carbons containing sulfur is large as compared with that of the battery configured with the anode of the pyrolyzed carbon obtained from benzene. Moreover, the initial capacity increases with the increase in the sulfur content. On the other hand, the capacity maintenance rate decreases with the increase in the sulfur content.

The carbon anode containing sulfur by only 4 wt %, which is not sufficiently large, showed a capacity and a capacity maintenance rate substantially equivalent to those of the pyrolyzed carbon anode.

In view of the capacity and the charge-discharge performance required for a secondary battery, it is concluded that an electrode configured with the carbon material containing sulfur by 7–35 wt % is excellent as an anode for a non-aqueous electrolyte secondary battery.

As apparent from the above-mentioned results, even if Na is employed in the anode as the alkali metal to be absorbed or intercalated by charging, the electrode configured with the carbon material containing sulfur gives an excellent anode for a non-aqueous electrolyte secondary battery.

Although the description is limited to the anode configured with the carbon material synthesized from polythiophene and chlorine of Example 3 as the starting material, it is confirmed that a similar advantage is obtained with any anodes shown in Example 1 and Example 2 in a non-aqueous electrolyte secondary battery having an alkali metal of Na.

Although the description is limited to the anodes configured with the carbon materials synthesized from thiophene, methane thiol, dimethyl sulfide, polythiophene, dithian and ethane thiol of Example 1 through Example 3 as the starting material, it is confirmed that a similar advantage is obtained with any anodes configured with the carbon material synthesized from a heterocyclic compound containing one or more sulfur atoms such as tetrahydrothiophene, thian, trithian, thiophthene, benzothiophene, thianthrene or the like, derivatives thereof, polymers thereof or the like, and a chain compound containing one or more sulfur atoms such as propane thiol, butane thiol, hexane thiol, heptane thiol, ethane dithiol, propane dithiol, dimethyl sulfide, diethyl sulfide, dipropyl sulfide, dimethyl disulfide, diethyl disulfide, dipropyl disulfide, or the like, derivatives thereof, polymers thereof or the like, as the starting material.

EXAMPLE 4

In this example, a carbon material containing oxygen was synthesized in a reaction vessel by heating the starting material of furan, polyfuran or pyran, which is a heterocyclic compound containing one or more oxygen atoms with chlorine, or a polyethylene oxide, which is a chain compound with chlorine, and its characteristic as an anode was investigated.

Further, as a comparative example, another investigation was made on an electrode configured with a thermally decomposed or pyrolyzed carbon obtained from benzene.

First, the carbon material containing oxygen was synthesized in the following manner.

As the reaction vessel, a quartz tube was used and the reaction temperature was fixed at 750° C. After evacuating the reaction tube, the inside pressure of the reaction tube was returned to atmospheric pressure with nitrogen, and each of the starting materials of various proportions was introduced into the reaction tube to synthesize each of the carbon materials containing oxygen at various proportions as listed in Table 14 through Table 17 below. In this process, furan and pyran were vaporized by heating and the resultant vaporized gases were introduced into the reaction tube by using nitrogen as the carrier gas. Further, in the case of polyfuran and polyethylene oxide, they were placed in the center of the reaction tube before introduction of chlorine.

TABLE 14

| Oxygen Content | Supply Amount (mole/hour) | |
| --- | --- | --- |
| (wt %) | furan | chlorine |
| 30 | 0.020 | 0.08 |
| 25 | 0.031 | 0.08 |
| 10 | 0.098 | 0.08 |
| 6.5 | 0.198 | 0.08 |
| 3 | 0.341 | 0.08 |

TABLE 15

| Oxygen Content | Supply Amount (mole/hour) | |
| --- | --- | --- |
| (wt %) | pyran | chlorine |
| 30 | 0.018 | 0.10 |
| 25 | 0.029 | 0.10 |
| 10 | 0.089 | 0.10 |
| 6.5 | 0.181 | 0.10 |
| 3 | 0.313 | 0.10 |

TABLE 16

| Oxygen Content | Supply Amount (mole/hour) | |
| --- | --- | --- |
| (wt %) | polyfuran | chlorine |
| 30 | 0.024 | 0.07 |
| 25 | 0.035 | 0.07 |
| 10 | 0.112 | 0.07 |
| 6.5 | 0.224 | 0.07 |
| 3 | 0.388 | 0.07 |

TABLE 17

| Oxygen Content | Supply Amount (mole/hour) | |
|---|---|---|
| (wt %) | polyethylene oxide | chlorine |
| 30 | 0.030 | 0.10 |
| 25 | 0.043 | 0.10 |
| 10 | 0.138 | 0.10 |
| 6.5 | 0.275 | 0.10 |
| 3 | 0.495 | 0.10 |

Next, an anode plate was prepared by using each of the listed carbon materials in a manner similar to that in Example 1, and a secondary battery was assembled with the anode to investigate the capacity and the charge-discharge performance.

Batteries configured with the anodes of the carbons each having an oxygen content of 3 wt %, 6.5 wt %, wt %, 25 wt %, and 30 wt % are named "A", "B", "C", "D", and "E", respectively. Further, a battery configured with the anode of the pyrolyzed carbon is named "F". These batteries have a larger electric capacity in their cathode. The capacity of the batteries is determined by the capacity of the respective anodes.

Charge-discharge cycles were repeated for each of the batteries by charging it at a constant current of 0.5 mA/cm$^2$ up to 4.4 V and discharging it as low as 3.0 V. FIG. 9 through FIG. 12 each show the discharge curve at the first cycle. Further, Table 18 through Table 21 below each list the discharge capacity at the first cycle and the discharge capacity at the 500th cycle, as well as the maintenance rate of the discharge capacity at the 500th cycle to the first cycle. In each table, the discharge capacity represents the capacity for 1 g of the carbon anode containing oxygen or the pyrolyzed carbon anode (comparative example).

TABLE 18

| | furan + chlorine (Present Invention) | |
|---|---|---|
| Oxygen Content (wt %) | Discharge capacity at first cycle (mAh/g) | Discharge capacity at 500th cycle (mAh/g) (capacity maintenance rate (%)) |
| 30 | 348 | 181 (52) |
| 25 | 341 | 266 (78) |
| 10 | 321 | 266 (83) |
| 6.5 | 248 | 221 (89) |
| 3 | 175 | 166 (95) |
| C (Comparative Example) | 163 | 156 (96) |

TABLE 19

| | pyran + chlorine (Present Invention) | |
|---|---|---|
| Oxygen Content (wt %) | Discharge capacity at first cycle (mAh/g) | Discharge capacity at 500th cycle (mAh/g) (capacity maintenance rate (%)) |
| 30 | 340 | 170 (50) |
| 25 | 330 | 244 (74) |
| 10 | 312 | 256 (82) |
| 6.5 | 242 | 208 (86) |
| 3 | 173 | 163 (94) |
| C (Comparative Example) | 163 | 156 (96) |

TABLE 20

| | polyfuran + chlorine (Present Invention) | |
|---|---|---|
| Oxygen Content (wt %) | Discharge capacity at first cycle (mAh/g) | Discharge capacity at 500th cycle (mAh/g) (capacity maintenance rate (%)) |
| 30 | 355 | 185 (52) |
| 25 | 348 | 268 (77) |
| 10 | 324 | 269 (83) |
| 6.5 | 256 | 220 (86) |
| 3 | 179 | 170 (95) |
| C (Comparative Example) | 163 | 156 (96) |

TABLE 21

| | polyethylene oxide + chlorine (Present Invention) | |
|---|---|---|
| Oxygen Content (wt %) | Discharge capacity at first cycle (mAh/g) | Discharge capacity at 500th cycle (mAh/g) (capacity maintenance rate (%)) |
| 30 | 350 | 186 (53) |
| 25 | 342 | 257 (75) |
| 10 | 319 | 258 (81) |
| 6.5 | 247 | 210 (85) |
| 3 | 173 | 163 (94) |
| C (Comparative Example) | 163 | 156 (96) |

As clearly shown in these tables, the initial discharge capacity of the batteries configured with the anodes of the carbons containing oxygen is large as compared with that of the battery configured with the anode of the pyrolyzed carbon obtained from benzene. With the increase in the oxygen content, while the initial capacity increases, the capacity maintenance rate decreases.

The carbon anode containing oxygen by 3 wt %, which is not sufficiently large, showed a capacity and a capacity maintenance rate substantially equivalent to those of the pyrolyzed carbon anode.

In view of the capacity and the charge-discharge performance required for a secondary battery, it is concluded that an electrode configured with the carbon material containing oxygen by 6.5–25 wt % is excellent as an anode for a non-aqueous electrolyte secondary battery.

EXAMPLE 5

In this example, a carbon material containing oxygen was synthesized in a reaction vessel by heating the starting material of dioxane, which is a heterocyclic compound containing two oxygen atoms with ferric chloride, or polyvinyl alcohol, which is a chain compound containing oxygen atoms with cupric chloride, and the characteristic of an anode configured with the carbon material was investigated.

The method for synthesizing the carbon materials containing oxygen was similar to that of Example 4, except for the reaction temperature of 700° C. Dioxane was vaporized by heating and the resultant vaporized gas was introduced into the reaction tube by using nitrogen as the carrier gas. Further, cupric chloride and ferric chloride were previously introduced into the central part of the reaction tube. Further, when cupric chloride was employed, the produced carbon material containing oxygen was deposited on the surface of cupric chloride in a molten state. On the other hand, ferric chloride was vaporized and reacted with dioxane in a gas phase. In either case, only the produced carbon material containing oxygen was separated from the reaction mixture for configuring the anodes. Table 22 and Table 23 below each list the supplying proportions of dioxane and ferric chloride of raw materials and the oxygen content in the produced carbon material.

TABLE 22

| Oxygen Content | Supply Amount (mole/hour) | |
|---|---|---|
| (wt %) | dioxane | ferric chloride |
| 30 | 0.101 | 0.40 |
| 25 | 0.133 | 0.40 |
| 10 | 0.398 | 0.40 |
| 6.5 | 0.832 | 0.40 |
| 3 | 1.447 | 0.40 |

TABLE 23

| Oxygen Content | Supply Amount (mole/hour) | |
|---|---|---|
| (wt %) | polyvinyl alcohol | cupric chloride |
| 30 | 0.118 | 0.30 |
| 25 | 0.152 | 0.30 |
| 10 | 0.465 | 0.30 |
| 6.5 | 0.958 | 0.30 |
| 3 | 1.702 | 0.30 |

By employing each of the synthesized carbon materials, a secondary battery was configured in a manner similar to that of Example 1, and the capacity and the charge-discharge performance was investigated.

Batteries configured with the anodes of the carbons each having an oxygen content of 3 wt %, 6.5 wt %, 10 wt %, 25 wt %, and 30 wt % are named "G", "H", "I", "J", and "K", respectively. These batteries have a larger electric capacity in their cathode. The capacity of the batteries are determined by the capacity of the anodes.

Charge-discharge cycles were repeated for each of the batteries by charging it at a constant current of 0.5 mA/cm$^2$ up to 4.4 V and discharging it as low as 3.0 V. FIG. 13 and FIG. 14 each show the discharge curve at the first cycle. Further, Table 24 and Table 25 below each list the discharge capacity at the first cycle and the discharge capacity at the 500th cycle, as well as the maintenance rate of the discharge capacity at the 500th cycle to the first cycle. In each table, the discharge capacity represents the capacity for 1 g of the carbon anode containing oxygen.

TABLE 24

| | dioxane + ferric chloride (Present Invention) | |
|---|---|---|
| Oxygen Content (wt %) | Discharge capacity at first cycle (mAh/g) | Discharge capacity at 500th cycle (mAh/g) (capacity maintenance rate (%)) |
| 30 | 339 | 173 (51) |
| 25 | 331 | 245 (74) |
| 10 | 311 | 249 (80) |
| 6.5 | 239 | 206 (86) |
| 3 | 170 | 160 (94) |

TABLE 25

| | polyvinyl alcohol + cupric chloride (Present Invention) | |
|---|---|---|
| Oxygen Content (wt %) | Discharge capacity at first cycle (mAh/g) | Discharge capacity at 500th cycle (mAh/g) (capacity maintenance rate (%)) |
| 30 | 348 | 188 (54) |
| 25 | 340 | 255 (75) |
| 10 | 321 | 263 (82) |
| 6.5 | 252 | 219 (87) |
| 3 | 177 | 168 (95) |

As clearly shown in these tables, the initial discharge capacity increases with the increase in the oxygen content. On the other hand, the capacity maintenance rate decreases with the increase in the oxygen content.

The carbon anode containing oxygen by only 3 wt %, which is not sufficiently large, showed a capacity and a capacity maintenance rate substantially equivalent to those of the pyrolyzed carbon anode.

In view of the capacity and the charge-discharge performance required for a secondary battery, it is concluded that an electrode configured with the carbon material containing oxygen by 6.5–25 wt % is excellent as an anode for a non-aqueous electrolyte secondary battery.

EXAMPLE 6

As an alkali metal to be intercalated in the anode carbon, Na was employed in this example. For each of the anodes of this example, carbon materials each having an oxygen content of 3 wt %, 6.5 wt %, 10 wt %, 25 wt %, and 30 wt % synthesized from polyfuran and chlorine of Example 4 were used. The procedure identical to that of Example 1 was followed except for the use of NaNiO$_2$ as the cathode active material and propylene carbonate which dissolved sodium perchlorate (NaClO$_4$) by 1 mole/l as the non-aqueous electrolyte.

By employing the pyrolyzed carbon obtained from benzene of the comparative example, another anode was prepared similarly, and a battery was configured with this anode.

Batteries configured with the anodes of the carbons each having an oxygen content of 3 wt %, 6.5 wt %, 10 wt %, 25 wt %, and 30 wt % are named "L", "M", "N", "O", and "P", respectively. Further, a battery configured with the anode of the pyrolyzed carbon is named "Q". These batteries have a larger electric capacity in their cathode. The capacity of each of the batteries is determined by the capacity of the anodes.

Figure 15:
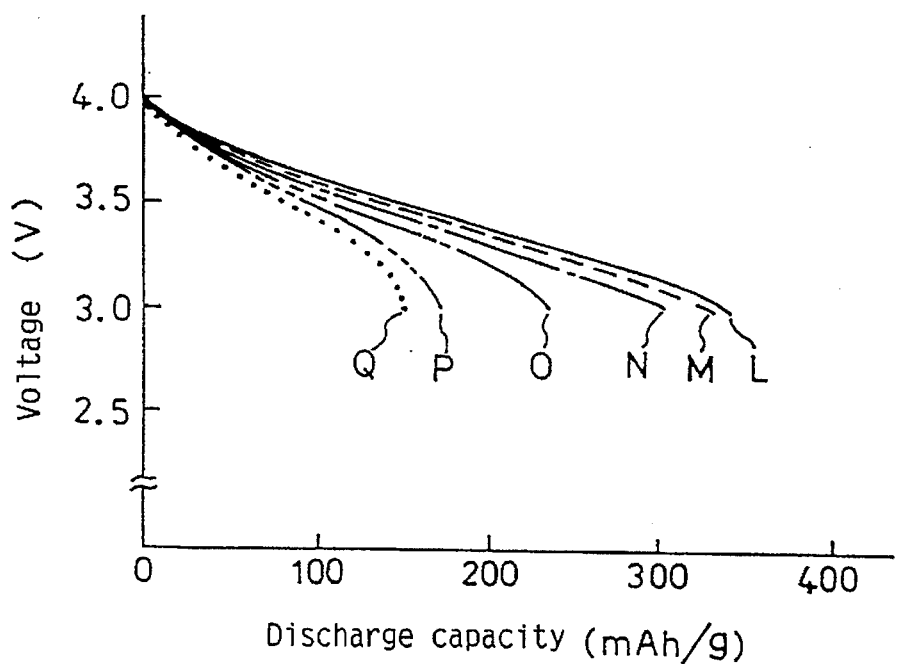
FIG. 15 is a diagram showing discharge curves at the first cycle of batteries configured with anodes comprising carbon materials containing oxygen at various proportions.
Figure 16:
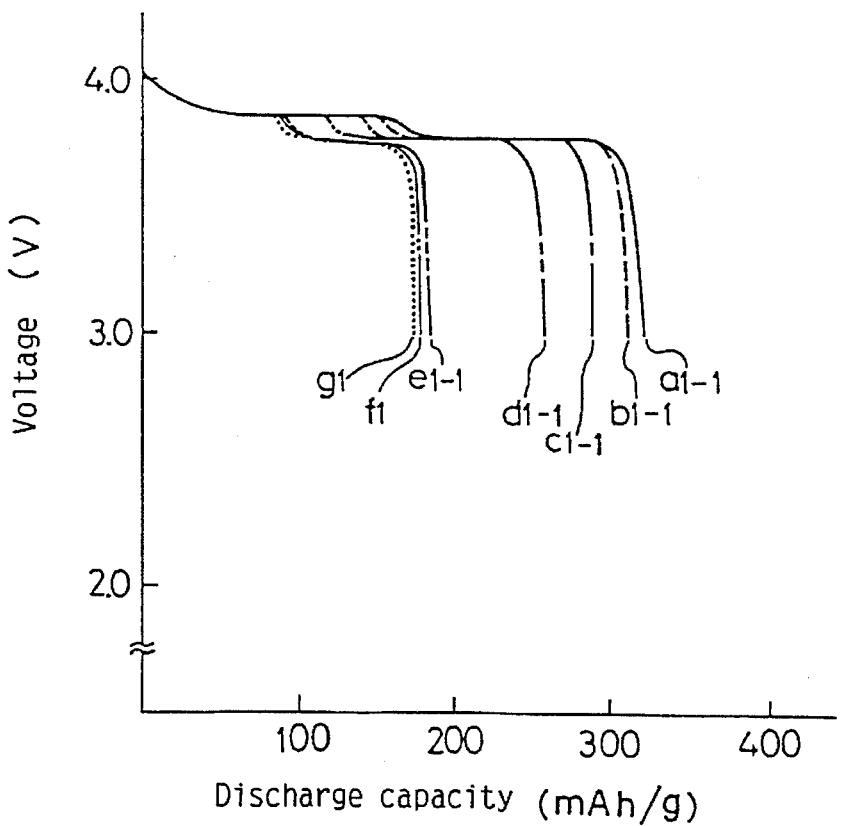
FIG. 16 is a diagram showing discharge curves at the first cycle of batteries configured with anodes comprising carbon materials containing nitrogen at various proportions.
Figure 17:
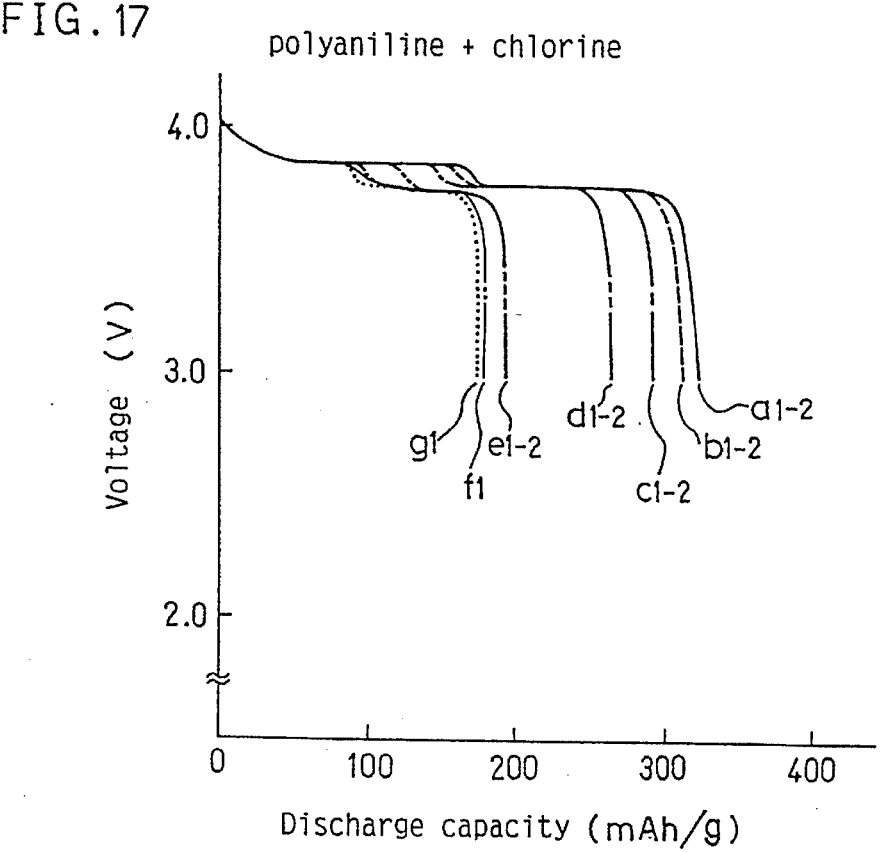
FIG. 17 is a diagram showing discharge curves at the first cycle of batteries configured with anodes comprising carbon materials containing nitrogen at various proportions.
Figure 18:
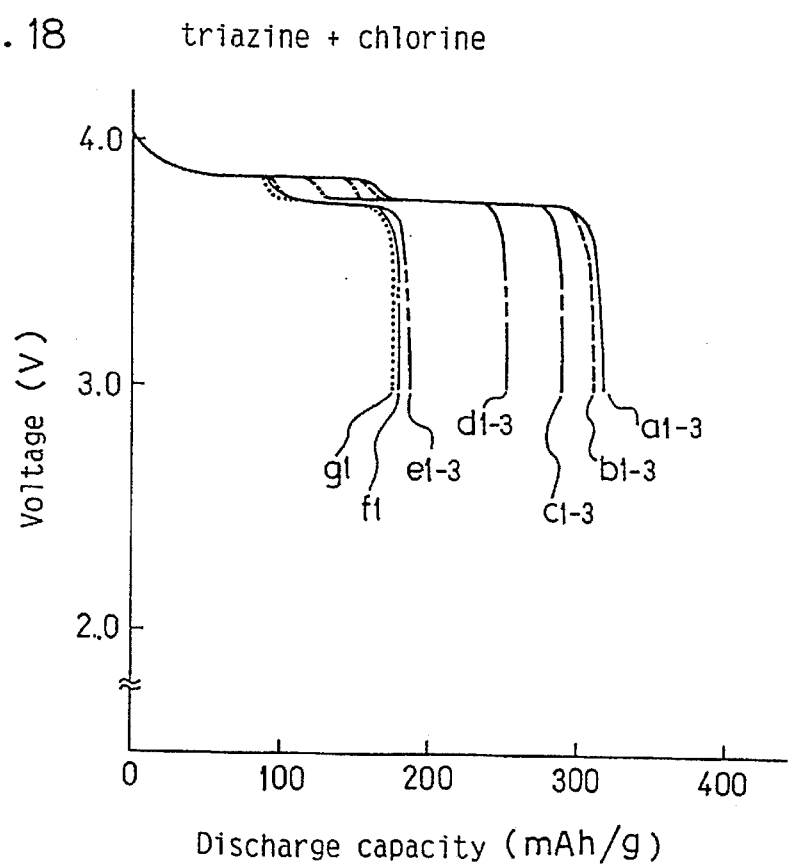
FIG. 18 is a diagram showing discharge curves at the first cycle of batteries configured with anodes comprising carbon materials containing nitrogen at various proportions.
Figure 19:
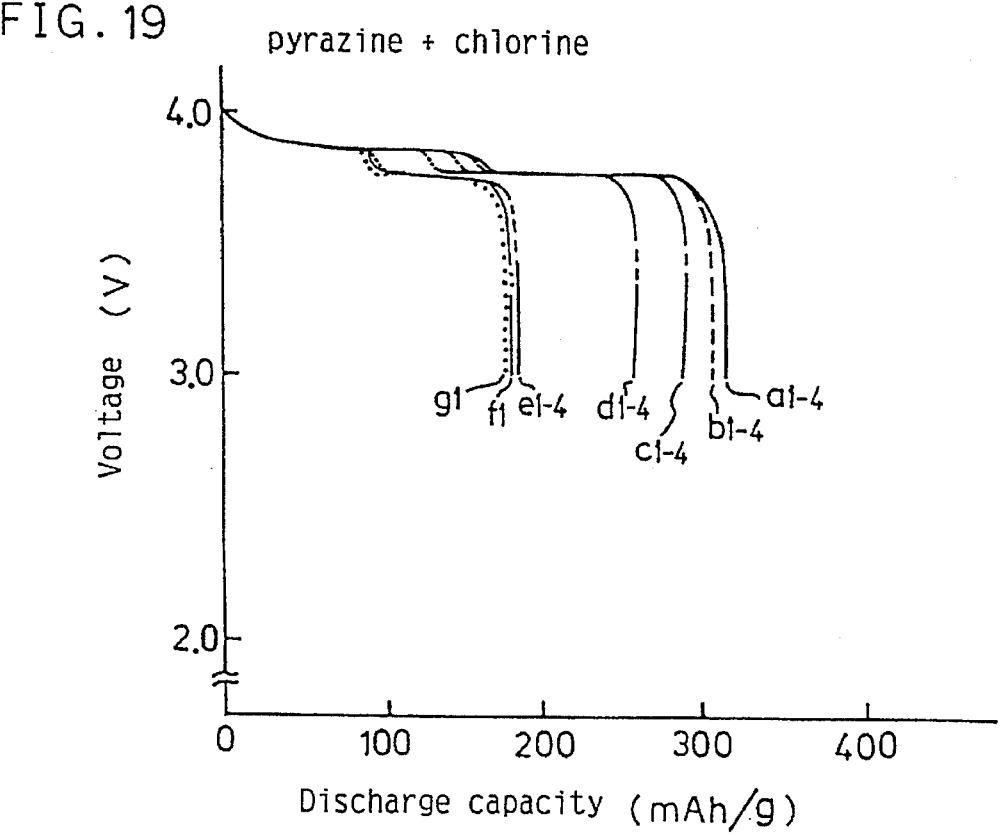
FIG. 19 is a diagram showing discharge curves at the first cycle of batteries configured with anodes comprising carbon materials containing nitrogen at various proportions.
Figure 20:
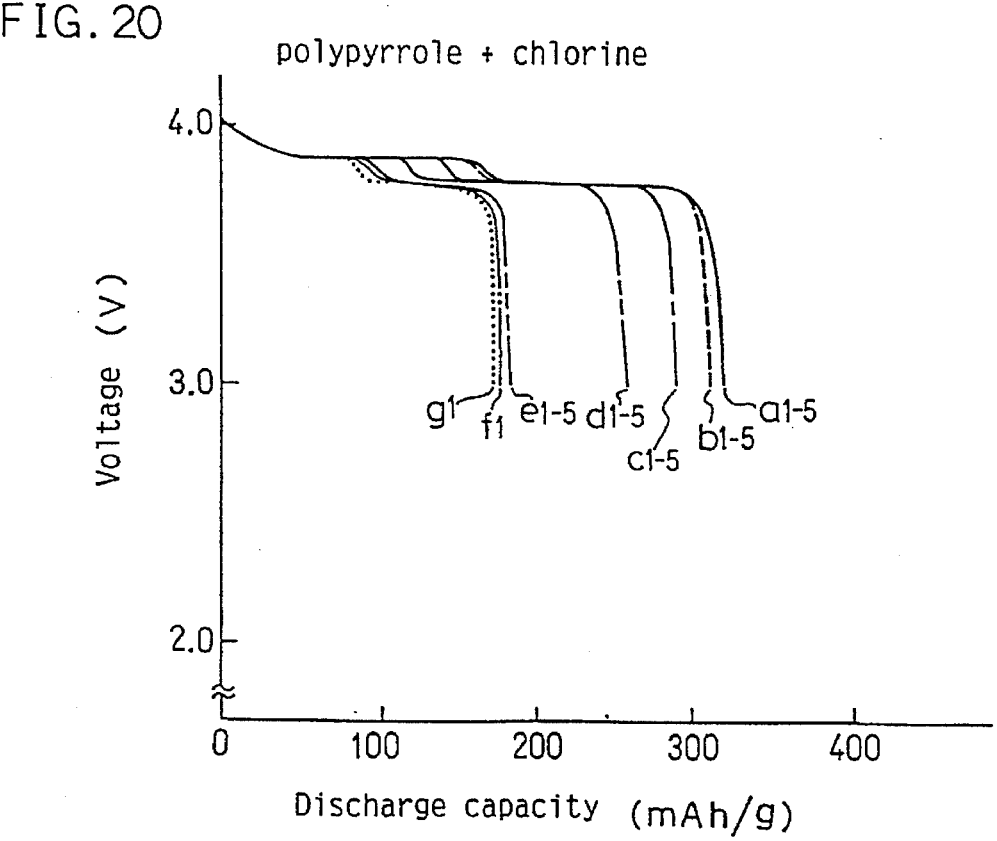
FIG. 20 is a diagram showing discharge curves at the first cycle of batteries configured with anodes comprising carbon materials containing nitrogen at various proportions.
Figure 21:
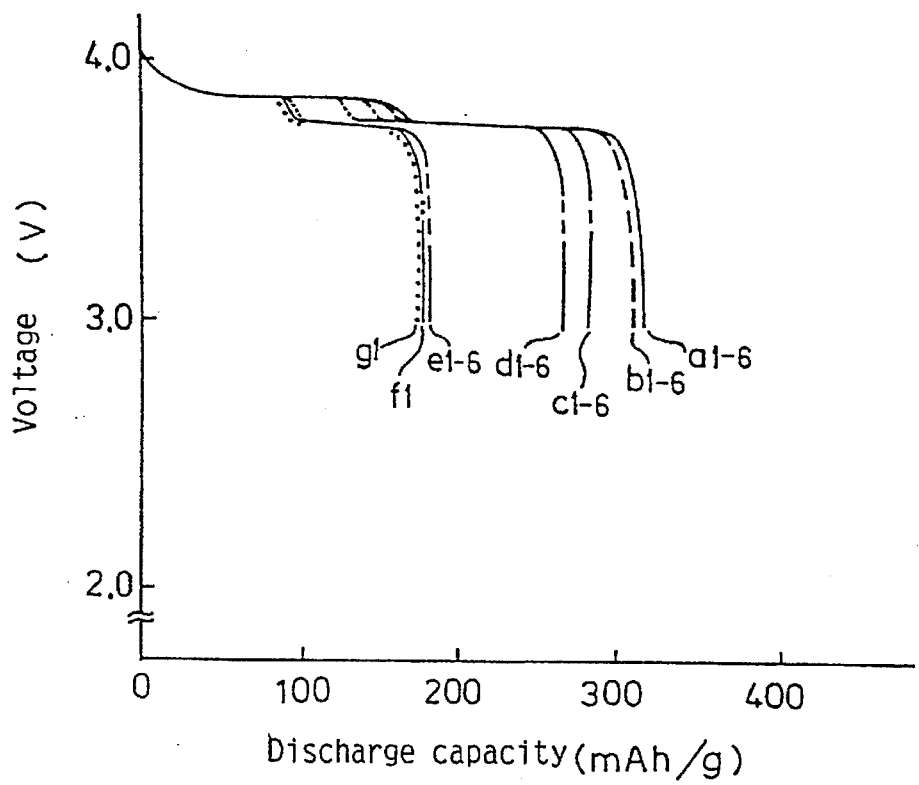
FIG. 21 is a diagram showing discharge curves at the first cycle of batteries configured with anodes comprising carbon materials containing nitrogen at various proportions.
Figure 22:
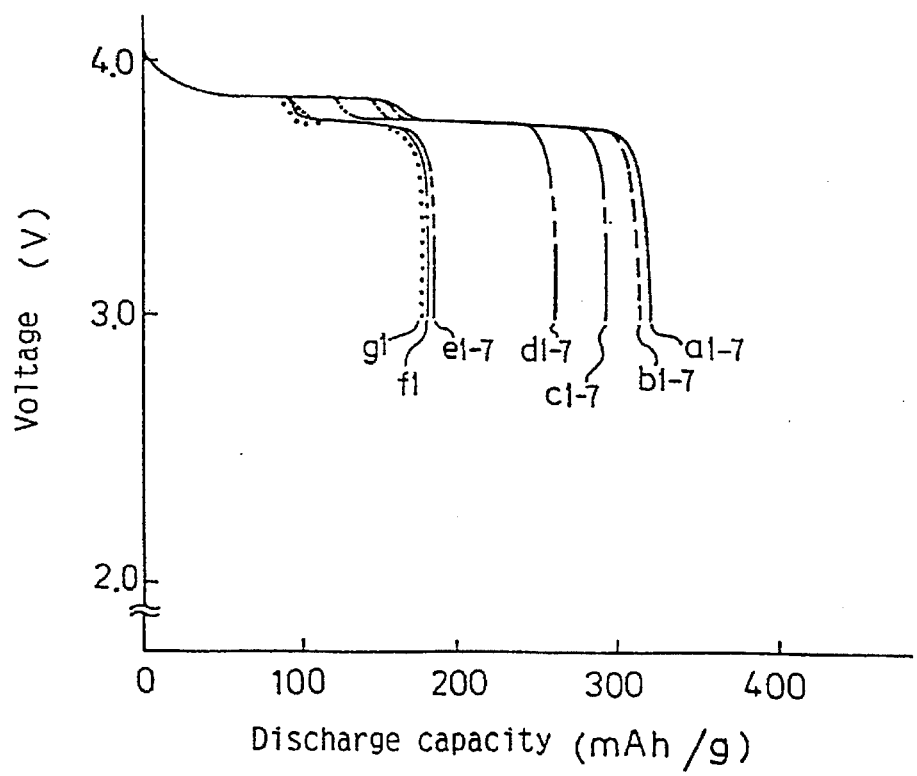
FIG. 22 is a diagram showing discharge curves at the first cycle of batteries configured with anodes comprising carbon materials containing nitrogen at various proportions.
Figure 23:
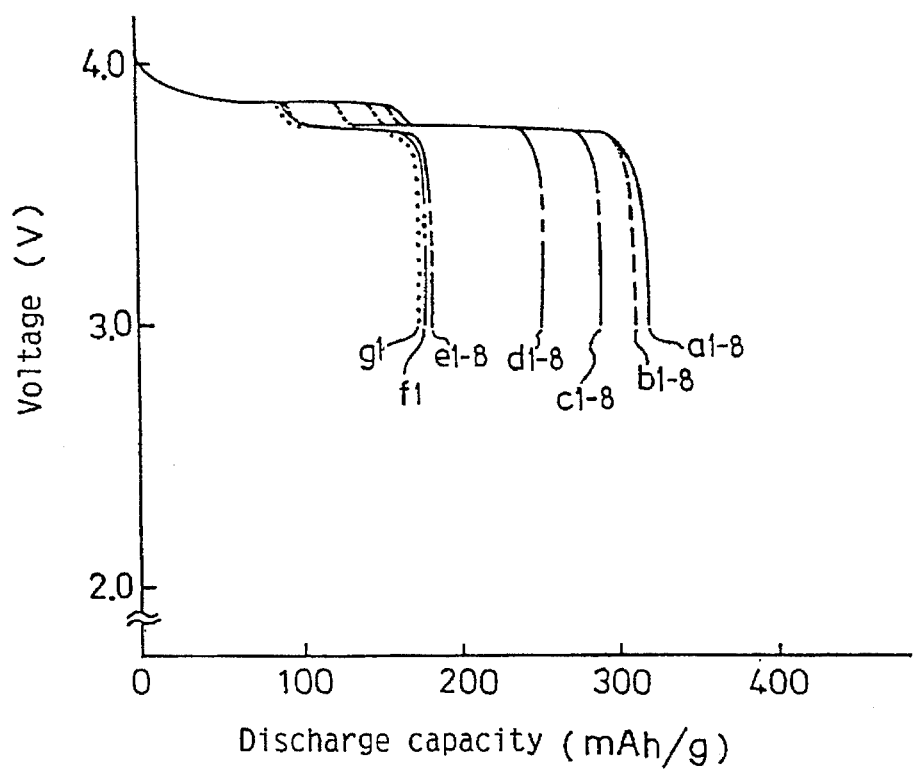
FIG. 23 is a diagram showing discharge curves at the first cycle of batteries configured with anodes comprising carbon materials containing nitrogen at various proportions.

Charge-discharge cycles were repeated for each of the batteries by charging it at a constant current of 0.5 mA/cm$^2$ up to 4.0 V and discharging it as low as 3.0 V. FIG. 15 shows the discharge curve at the first cycle. Further, Table 26 below lists the discharge capacity at the first cycle and the discharge capacity at the 500th cycle, as well as the maintenance rate of the discharge capacity at the 500th cycle to the first cycle.

TABLE 26

| | polyfuran + chlorine (Present Invention) | |
|---|---|---|
| Oxygen Content (wt %) | Discharge capacity at first cycle (mAh/g) | Discharge capacity at 500th cycle (mAh/g) (capacity maintenance rate (%)) |
| 30 | 341 | 170 (50) |
| 25 | 331 | 248 (75) |
| 10 | 302 | 242 (80) |
| 6.5 | 230 | 193 (84) |
| 3 | 172 | 160 (93) |
| C (Comparative Example) | 152 | 143 (94) |

As clearly shown in the table, the initial discharge capacity of the batteries configured with the anodes of the carbons containing oxygen is large as compared with that of the battery configured with the anode of the pyrolyzed carbon obtained from benzene. Further, while the initial capacity increases with the increase in the oxygen content, the capacity maintenance rate decreases with the increase in the oxygen content.

The carbon anode containing oxygen by only 3 wt %, which is not sufficiently large, showed a capacity and a capacity maintenance rate substantially equivalent to those of the pyrolyzed carbon anode.

In view of the capacity and the charge-discharge performance required for a secondary battery, it is concluded that an electrode configured with the carbon material containing oxygen by 6.5–25 wt % is excellent as an anode for a non-aqueous electrolyte secondary battery.

As apparent from the above-mentioned results, even if Na is employed as the alkali metal to be absorbed or intercalated in the anode by charging, the electrode configured with the carbon material containing oxygen of the present invention gives an excellent anode for a non-aqueous electrolyte secondary battery.

Although the description is limited to the anode configured with the carbon material synthesized from polyfuran and chlorine of Example 6 as the starting material, it is confirmed that a similar advantage is obtained with any anodes shown in Example 4 and Example 5, in a non-aqueous electrolyte secondary battery whose alkali metal is Na.

In Example 4 through Example 6, the description has exclusively been made on the anodes configured with the carbon materials synthesized by employing the starting materials of furan, polyfuran, pyran, dioxane, polyethylene oxide, and polyvinyl alcohol. However, it is confirmed that a substantially similar advantage is obtained with any anodes configured with the carbon material synthesized by employing the starting material of a cyclic compound containing one or more oxygen atoms such as tetrahydrofuran, trioxane, dioxolan, oxolan, benzofuran, butyrolactone, chromene, chroman, benzoquinone, naphthol, naphthoquinone, phenol, phenolic resin or the like, derivatives thereof, polymers thereof or the like, or polymers or copolymers of polyethers such as polypropylene oxide or the like, or polyesters such as polyethylene terephthalate, alkyd resin, maleic acid resin or the like, or a chain compound containing one or more oxygen atoms such as alcohols of ethyl alcohol, aldehydes of acetoaldehyde, carboxylic acids of acetic acid or the like.

EXAMPLE 7

In this example, a carbon material containing nitrogen was synthesized in a reaction vessel by heating the starting material of aniline or polyaniline which is a cyclic compound containing one or more nitrogen atoms with chlorine, or triazine, pyrazine or polypyrrole, which is a heterocyclic compound containing two or more nitrogen atoms with chlorine, or acetonitrile or polyacrylonitrile, which is a chain nitrile containing one or more nitrogen atoms with chlorine, and its characteristic as an anode was investigated.

Further, as comparative examples, additional investigations were made on the characteristics of a carbob material synthesized from a single starting material of pyridine, which is a heterocyclic compound containing only one nitrogen atom, another carbon material synthesized from pyridine and chlorine, and a thermally decomposed or pyrolyzed carbon obtained from benzene alone.

In the syntheses of these carbon materials containing nitrogen, the reaction temperature was fixed at 1,000° C.

As the reaction vessel, a quartz tube was used. After evacuating the reaction tube, the inside pressure of the reaction tube was returned to atmospheric pressure with nitrogen, and each of the starting materials of various proportions was introduced into the quartz tube to synthesize each of the carbon materials containing nitrogen at the various proportions as listed in Table 27 through Table 34 below. In this process, aniline, triazine, pyrazine, acetonitrile, and pyridine were vaporized by heating and the resultant vaporized gases were introduced into the reaction tube by using nitrogen as the carrier gas. Further, in case of polyaniline, polypyrrole and polyacrylonitrile, they were placed in the central part of the reaction tube before introduction of chlorine.

The carbon material synthesized from pyridine alone by heating has a nitrogen content of only 2.58% and contains a large quantity of carbon.

TABLE 27

| Nitrogen Content | Supply Amount (mole/hour) | |
|---|---|---|
| (wt%) | aniline | chlorine |
| 7.2 | 0.090 | 0.10 |
| 10.5 | 0.059 | 0.10 |
| 13.5 | 0.045 | 0.10 |
| 18.3 | 0.030 | 0.10 |
| 18.9 | 0.029 | 0.10 |

TABLE 28

| Nitrogen Content | Supply Amount (mole/hour) | |
|---|---|---|
| (wt %) | polyaniline | chlorine |
| 7.2 | 0.098 | 0.10 |
| 10.5 | 0.068 | 0.10 |
| 13.5 | 0.051 | 0.10 |
| 18.3 | 0.037 | 0.10 |
| 18.9 | 0.035 | 0.10 |

TABLE 29

| Nitrogen Content | Supply Amount (mole/hour) | |
|---|---|---|
| (wt %) | triazine | chlorine |
| 7.2 | 0.102 | 0.040 |
| 10.5 | 0.065 | 0.040 |
| 13.5 | 0.048 | 0.040 |
| 18.3 | 0.034 | 0.040 |
| 18.9 | 0.032 | 0.040 |

TABLE 30

| Nitrogen Content | Supply Amount (mole/hour) | |
| --- | --- | --- |
| (wt %) | pyrazine | chlorine |
| 7.2 | 0.151 | 0.060 |
| 10.5 | 0.101 | 0.060 |
| 13.5 | 0.073 | 0.060 |
| 18.3 | 0.051 | 0.060 |
| 18.9 | 0.049 | 0.060 |

TABLE 31

| Nitrogen Content | Supply Amount (mole/hour) | |
| --- | --- | --- |
| (wt %) | polypyrrole | chlorine |
| 7.2 | 0.203 | 0.10 |
| 10.5 | 0.135 | 0.10 |
| 13.5 | 0.101 | 0.10 |
| 18.3 | 0.071 | 0.10 |
| 18.9 | 0.066 | 0.10 |

TABLE 32

| Nitrogen Content | Supply Amount (mole/hour) | |
| --- | --- | --- |
| (wt %) | acetonitrile | chlorine |
| 7.2 | 0.070 | 0.030 |
| 10.5 | 0.047 | 0.030 |
| 13.5 | 0.034 | 0.030 |
| 18.3 | 0.025 | 0.030 |
| 18.9 | 0.023 | 0.030 |

TABLE 33

| Nitrogen Content | Supply Amount (mole/hour) | |
| --- | --- | --- |
| (wt %) | polyacrylonitrile | chlorine |
| 7.2 | 0.102 | 0.040 |
| 10.5 | 0.069 | 0.040 |
| 13.5 | 0.051 | 0.040 |
| 18.3 | 0.035 | 0.040 |
| 18.9 | 0.034 | 0.040 |

TABLE 34

| Nitrogen Content | Supply Amount (mole/hour) | |
| --- | --- | --- |
| (wt %) | pyridine | chlorine |
| 7.2 | 0.167 | 0.080 |
| 10.5 | 0.068 | 0.080 |
| 13.5 | 0.049 | 0.080 |
| 18.3 | 0.035 | 0.080 |
| 18.9 | 0.033 | 0.080 |

Next, an anode plate was prepared by using each of the listed carbon materials in a manner similar to that in Example 1, and a secondary battery was assembled with the anode to investigate the capacity and the charge-discharge performance.

The electrodes and the configuration of the battery are the same as those of Example 1, except for the use of polypropylene carbonate solution which dissolves lithium trifluoromethane sulfonate ($LiCF_3SO_3$) by 1 mole/l as the non-aqueous electrolyte.

Batteries configured with the anodes of the carbons each having a nitrogen content of 7.2 wt %, 10.5 wt %, 13.5 wt %, 18.3 wt %, and 18.9 wt % are named "al", "bl", "cl", "dl", and "el", respectively. Further, a battery configured with the anode of the carbon synthesized from pyridine alone is named "fl", and a battery configured with the anode of the pyrolyzed carbon (C) is named "gl". These batteries have a larger electric capacity in their cathode. The capacity of each of the batteries is determined by the capacity of the anodes.

Charge-discharge cycles were repeated for each of the batteries by charging it at a constant current of 0.5 mA/cm² up to 4.4 V and discharging it as low as 3.0 V. FIG. 16 through FIG. 23 each show the discharge curve at the first cycle. Further, Table 35 through Table 42 below each list the discharge capacity at the first cycle and the discharge capacity at the 500th cycle, as well as the maintenance rate of the discharge capacity at the 500th cycle to the first cycle. In these tables, the discharge capacity represents the capacity for 1 g of the carbon anode containing sulfur or the pyrolyzed carbon.

TABLE 35

| | aniline + chlorine (Present Invention) | |
| --- | --- | --- |
| Nitrogen Content (wt %) | Discharge capacity at first cycle (mAh/g) | Discharge capacity at 500th cycle (mAh/g) (capacity maintenance rate (%)) |
| 2.58 (Comparative Example) | 177 | 172 (97) |
| 7.2 | 185 | 176 (95) |
| 10.5 | 258 | 243 (94) |
| 13.5 | 286 | 263 (92) |
| 18.3 | 310 | 254 (82) |
| 18.9 | 319 | 217 (68) |
| C (Comparative Example) | 175 | 170 (97) |

TABLE 36

| | polyaniline + chlorine (Present Invention) | |
| --- | --- | --- |
| Nitrogen Content (wt %) | Discharge capacity at first cycle (mAh/g) | Discharge capacity at 500th cycle (mAh/g) (capacity maintenance rate (%)) |
| 2.58 (Comparative Example) | 177 | 172 (97) |
| 7.2 | 189 | 178 (94) |
| 10.5 | 261 | 243 (93) |
| 13.5 | 290 | 267 (92) |
| 18.3 | 314 | 264 (84) |
| 18.9 | 322 | 219 (68) |
| C (Comparative Example) | 175 | 170 (97) |

TABLE 37

| | triazine + chlorine (Present Invention) | |
| --- | --- | --- |
| Nitrogen Content (wt %) | Discharge capacity at first cycle (mAh/g) | Discharge capacity at 500th cycle (mAh/g) (capacity maintenance rate (%)) |
| 2.58 (Comparative Example) | 177 | 172 (97) |

TABLE 37-continued triazine + chlorine (Present Invention)

| Nitrogen Content (wt %) | Discharge capacity at first cycle (mAh/g) | Discharge capacity at 500th cycle (mAh/g) (capacity maintenance rate (%)) |
|---|---|---|
| 7.2 | 185 | 174 (94) |
| 10.5 | 249 | 229 (92) |
| 13.5 | 286 | 257 (90) |
| 18.3 | 310 | 260 (84) |
| 18.9 | 317 | 219 (69) |
| C (Comparative Example) | 175 | 170 (97) |

TABLE 38 pyrazine + chlorine (Present Invention)

| Nitrogen Content (wt %) | Discharge capacity at first cycle (mAh/g) | Discharge capacity at 500th cycle (mAh/g) (capacity maintenance rate (%)) |
|---|---|---|
| 2.58 (Comparative Example) | 177 | 172 (97) |
| 7.2 | 182 | 173 (95) |
| 10.5 | 256 | 236 (92) |
| 13.5 | 284 | 253 (89) |
| 18.3 | 306 | 251 (82) |
| 18.9 | 314 | 220 (70) |
| C (Comparative Example) | 175 | 170 (97) |

TABLE 39 polypyrrole + chlorine (Present Invention)

| Nitrogen Content (wt %) | Discharge capacity at first cycle (mAh/g) | Discharge capacity at 500th cycle (mAh/g) (capacity maintenance rate (%)) |
|---|---|---|
| 2.58 (Comparative Example) | 177 | 172 (97) |
| 7.2 | 185 | 176 (95) |
| 10.5 | 260 | 239 (92) |
| 13.5 | 287 | 258 (90) |
| 18.3 | 310 | 260 (84) |
| 18.9 | 318 | 223 (70) |
| C (Comparative Example) | 175 | 170 (97) |

TABLE 40 acetonitrile + chlorine (Present Invention)

| Nitrogen Content (wt %) | Discharge capacity at first cycle (mAh/g) | Discharge capacity at 500th cycle (mAh/g) (capacity maintenance rate (%)) |
|---|---|---|
| 2.58 (Comparative Example) | 177 | 172 (97) |
| 7.2 | 180 | 169 (94) |
| 10.5 | 255 | 230 (90) |
| 13.5 | 280 | 244 (87) |
| 18.3 | 309 | 250 (81) |
| 18.9 | 315 | 211 (67) |
| C (Comparative Example) | 175 | 170 (97) |

TABLE 41 polyacrylonitrile + chlorine (Present Invention)

| Nitrogen Content (wt %) | Discharge capacity at first cycle (mAh/g) | Discharge capacity at 500th cycle (mAh/g) (capacity maintenance rate (%)) |
|---|---|---|
| 2.58 (Comparative Example) | 177 | 172 (97) |
| 7.2 | 184 | 175 (95) |
| 10.5 | 260 | 242 (93) |
| 13.5 | 290 | 258 (89) |
| 18.3 | 314 | 261 (83) |
| 18.9 | 320 | 224 (70) |
| C (Comparative Example) | 175 | 170 (97) |

TABLE 42 pyridine + chlorine (Present Invention)

| Nitrogen Content (wt %) | Discharge capacity at first cycle (mAh/g) | Discharge capacity at 500th cycle (mAh/g) (capacity maintenance rate (%)) |
|---|---|---|
| 2.58 (Comparative Example) | 177 | 172 (97) |
| 7.2 | 180 | 162 (90) |
| 10.5 | 252 | 207 (82) |
| 13.5 | 283 | 207 (73) |
| 18.3 | 310 | 211 (68) |
| 18.9 | 318 | 165 (52) |
| C (Comparative Example) | 175 | 170 (97) |

As clearly shown in these tables, the batteries configured with the anodes of the carbons having a nitrogen content of 18.9 wt %, synthesized from any of the starting materials, have the largest initial discharge capacity. The charge-discharge performance, which is one of the important characteristics of the secondary battery, was superior in the batteries in accordance with the present invention to that in the battery of the comparative example configured with an anode of the carbon material synthesized from the pyridine and chlorine. The batteries of the present invention demonstrated a larger capacity at the 500th cycle, compared with the battery of the comparative example.

Furthermore, the initial capacity of the electrode configured with the material containing nitrogen increases with the increase in the nitrogen content. On the other hand, the capacity maintenance rate decreases with the increase in the nitrogen content.

The carbon anode containing nitrogen by only 7.2 wt % which is not sufficiently large, showed a capacity and a capacity maintenance rate substantially equivalent to those of the pyrolyzed carbon anode.

In view of the capacity and the charge-discharge performance required for a secondary battery, it is concluded that an electrode configured with the carbon material containing nitrogen by 10.5–18.3 wt % is excellent as an anode for a non-aqueous electrolyte secondary battery.

EXAMPLE 8

In this example, a carbon material containing nitrogen was synthesized in a reaction vessel by heating the starting material of pyrrole or piperazine, which is a heterocyclic compound containing one or two nitrogen atoms with cupric chloride, or acetonitrile, which is a chain nitrile containing one nitrogen atom with ferric chloride, and the characteristic of an anode configured with the carbon material was investigated.

The synthesis of the carbon material containing nitrogen was performed by fixing the reaction temperature at 800° C.

As the reaction vessel, a quartz tube was used. After evacuating the reaction tube, the inside pressure of the reaction tube was returned to atmospheric pressure with nitrogen, and each of the starting materials of various proportions was introduced into the quartz tube to synthesize each of the carbon materials containing nitrogen at various proportions as listed in Table 43 through Table 45 below. In this process, pyrrole, piperazine and acetonitrile were vaporized by heating and the resultant vaporized gases were introduced into the reaction tube by using nitrogen as the carrier gas. Further, cupric chloride and ferric chloride were introduced into the central part of the reaction tube in advance. Further, in a case of cuptic chloride, the produced carbon material containing nitrogen was deposited on the surface of the cupric chloride in a molten state. On the other hand, since ferric chloride was in a vaporized state, it reacted with acetonitrile in a gas phase. In either case, only the produced carbon material containing nitrogen was separated from the reaction mixture for configuring the anodes. Table 43 through Table 45 below each list the supplying proportions of pyrrole and cupric chloride of raw materials and the nitrogen content in the produced carbon material.

TABLE 43

| Nitrogen Content | Supply Amount (mole/hour) | |
|---|---|---|
| (wt %) | pyrrole | cupric chloride |
| 7.2 | 0.267 | 0.200 |
| 10.5 | 0.178 | 0.200 |
| 13.5 | 0.134 | 0.200 |
| 18.3 | 0.092 | 0.200 |
| 18.9 | 0.089 | 0.200 |

TABLE 44

| Nitrogen Content | Supply Amount (mole/hour) | |
|---|---|---|
| (wt %) | piperazine | cupric chloride |
| 7.2 | 0.155 | 0.213 |
| 10.5 | 0.103 | 0.213 |
| 13.5 | 0.075 | 0.213 |
| 18.3 | 0.052 | 0.213 |
| 18.9 | 0.050 | 0.213 |

TABLE 45

| Nitrogen Content | Supply Amount (mole/hour) | |
|---|---|---|
| (wt %) | acetonitrile | ferric chloride |
| 7.2 | 0.090 | 0.030 |
| 10.5 | 0.054 | 0.030 |
| 13.5 | 0.042 | 0.030 |
| 18.3 | 0.029 | 0.030 |
| 18.9 | 0.028 | 0.030 |

By employing each of the synthesized carbon materials, a secondary battery was configured in a manner similar to that of Example 1, and the capacity and the charge-discharge performance were investigated.

The electrodes and the configuration of the battery are the same as those of Example 7. Batteries configured with the anodes of the carbon materials each having a nitrogen content of 7.2 wt %, 10.5 wt %, 13.5 wt %, 18.5 wt %, and 18.9 wt % are named "hl", "il", "jl", "kl", and "ll", respectively.

Figure 24:
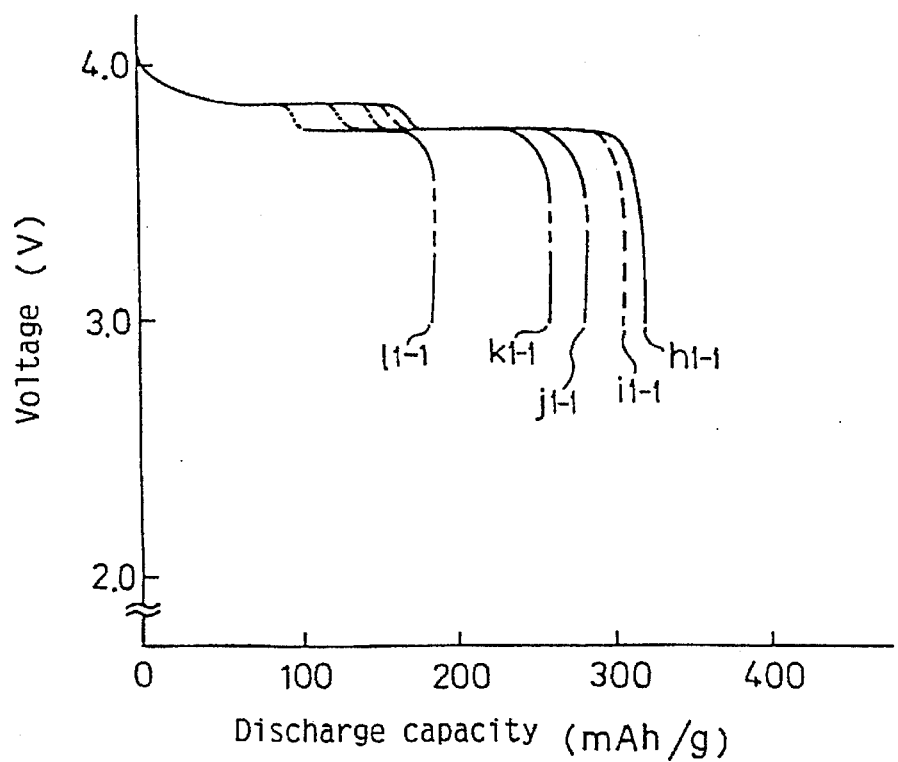
FIG. 24 is a diagram showing discharge curves at the first cycle of batteries configured with anodes comprising carbon materials containing nitrogen at various proportions.

These batteries have a larger electric capacity in their cathode. The capacity of each of the batteries is determined by the capacity of the respective anodes. Charge-discharge cycles were repeated for each of the batteries by charging at a constant current of 0.5 mA/cm$^2$ up to 4.4 V and discharging as low as 3.0 V. FIG. 24 through FIG. 26 each show the discharge curve at the first cycle. Further, Table 46 through Table 48 below each list the discharge capacity at the first cycle and the discharge capacity at the 500th cycle, as well as the maintenance rate of the discharge capacity at the 500th cycle to the first cycle. In each table, the discharge capacity represents the capacity for 1 g of the carbon anode containing sulfur.

TABLE 46

| | pyrrole + cupric chloride (Present Invention) | |
|---|---|---|
| Nitrogen Content (wt %) | Discharge capacity at first cycle (mAh/g) | Discharge capacity at 500th cycle (mAh/g) (capacity maintenance rate (%)) |
| 7.2 | 183 | 165 (90) |
| 10.5 | 258 | 214 (83) |
| 13.5 | 280 | 221 (79) |
| 18.3 | 306 | 233 (76) |
| 18.9 | 318 | 181 (57) |

TABLE 47

| | piperazine + cuprin chloride (Present Invention) | |
|---|---|---|
| Nitrogen Content (wt %) | Discharge capacity at first cycle (mAh/g) | Discharge capacity at 500th cycle (mAh/g) (capacity maintenance rate (%)) |
| 7.2 | 187 | 172 (92) |
| 10.5 | 261 | 222 (85) |
| 13.5 | 290 | 241 (83) |
| 18.3 | 310 | 248 (80) |
| 18.9 | 320 | 198 (62) |

TABLE 48

| | acetonitrile + ferric chloride (Present Invention) | |
|---|---|---|
| Nitrogen Content (wt %) | Discharge capacity at first cycle (mAh/g) | Discharge capacity at 500th cycle (mAh/g) (capacity maintenance rate (%)) |
| 7.2 | 183 | 168 (92) |
| 10.5 | 260 | 218 (84) |
| 13.5 | 286 | 232 (81) |
| 18.3 | 323 | 252 (78) |
| 18.9 | 330 | 198 (60) |

As clearly shown in these tables, the batteries configured with the anodes of the carbons each having a nitrogen content of 18.9 wt %, synthesized from any of the starting materials, have the largest initial discharge capacity. The charge-discharge performance, which is one of the important characteristics of the secondary battery, was superior in the batteries in accordance with the present invention to the battery of the comparative example configured with an anode of the carbon material synthesized from pyridine and chlorine shown in Example 7. The batteries of the present invention demonstrated a larger capacity at the 500th cycle, compared with the battery of the comparative example. In particular, the battery configured with an anode of the carbon material synthesized from piperazine, which is a heterocyclic compound containing two nitrogen atoms, or the one synthesized from acetonitrile, which is a chain nitrile containing a nitrogen atom, demonstrated a favorable characteristic.

While the initial discharge capacity of the carbon electrode containing nitrogen decreased with the decrease in the nitrogen content, the capacity maintenance rate improved with the decrease in the nitrogen content.

The carbon anode containing nitrogen by only 7.2 wt %, which is not sufficiently large, showed a capacity and a capacity maintenance rate substantially equivalent to those of the pyrolyzed carbon anode (C) shown in Example 7.

In view of the capacity and the charge-discharge performance required for a secondary battery, it is concluded that an electrode configured with the carbon material containing nitrogen by 10.5–18.3 wt % is excellent as an anode for a non-aqueous electrolyte secondary battery.

EXAMPLE 9

As an alkali metal to be absorbed or intercalated in the anode carbon, in place of Li in Example 7 and Example 8, Na was employed in this example. For each of the anodes of this example, carbon materials each having a nitrogen content of 7.2 wt %, 10.5 wt %, 13.5 wt %, 18.3 wt %, and 18.9 wt % synthesized from polyacrylonitrile and chlorine of Example 7 were used. The procedure identical to that of Example 7 was followed except for the use of NaNiO$_2$ as the cathode active material and γ-butyrolactone which dissolved sodium perchlorate (NaClO$_4$) by 1 mole/l as the non-aqueous electrolyte.

As a comparative example, another anode was prepared by employing the pyrolyzed carbon obtained from benzene similarly, and a battery was configured with this anode.

Batteries configured with the anodes of the carbons each having a nitrogen content of 7.2 wt %, 10.5 wt %, 13.5 wt %, 18.3 wt %, and 18.9 wt % are named "ml", "nl", "ol", "pl", and "ql", respectively. The battery configured with the anode of thermally decomposed carbon was named "rl". These batteries have a larger electric capacity in their cathode. The capacity of each of the batteries is determined by the capacity of the respective anodes.

Figure 27:
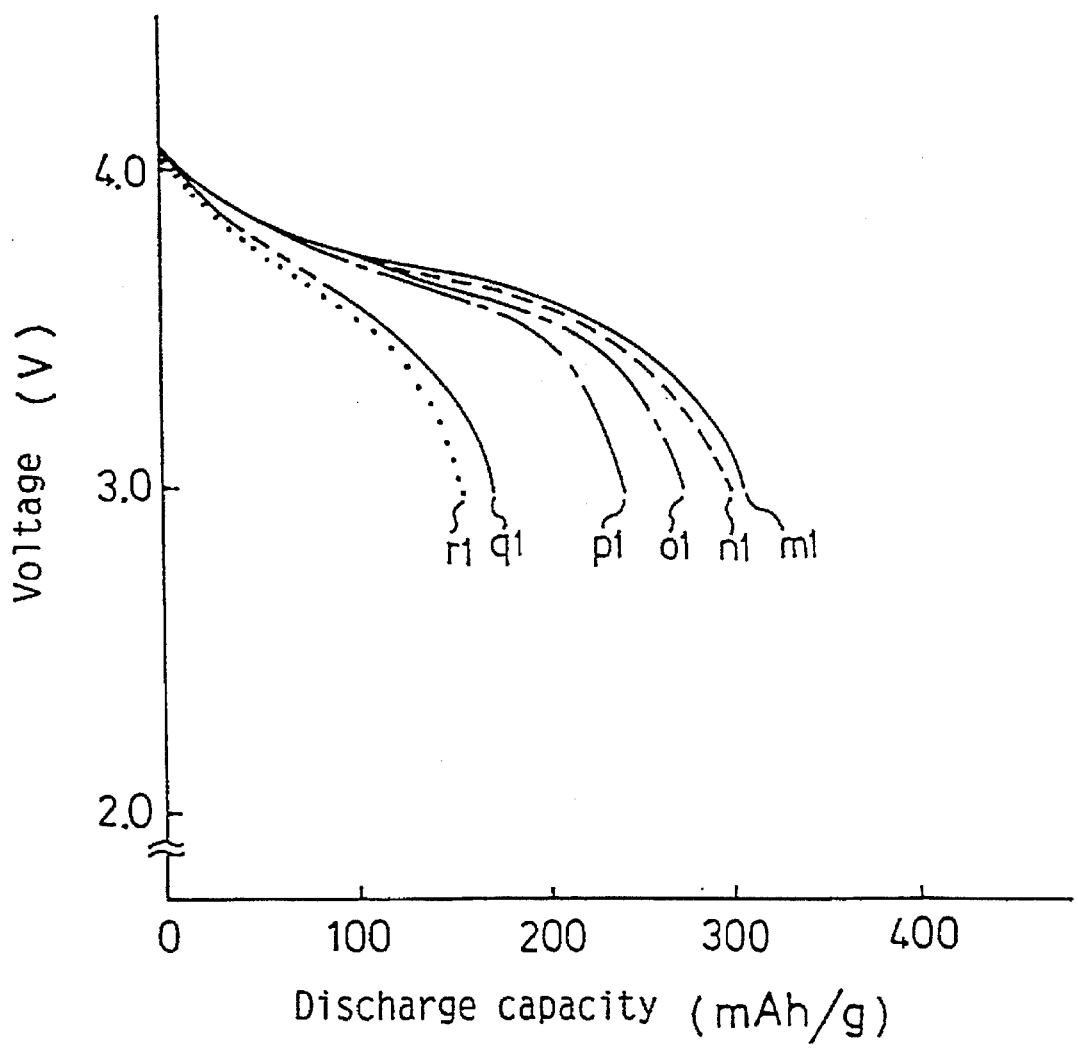
FIG. 27 is a diagram showing discharge curves at the first cycle of batteries configured with anodes comprising carbon materials containing nitrogen at various proportions.

Charge-discharge cycles were repeated for each of the batteries by charging it at a constant current of 0.5 mA/cm$^2$ up to 4.0 V and discharging it as low as 3.0 V. FIG. 27 shows the discharge curve at the first cycle. Further, Table 49 below lists the discharge capacity at the first cycle and the discharge capacity at the 500th cycle, as well as the maintenance rate of the discharge capacity at the 500th cycle to the first cycle.

TABLE 49

| | polyacrylonitrile + chlorine (Present Invention) | |
|---|---|---|
| Nitrogen Content (wt %) | Discharge capacity at first cycle (mAh/g) | Discharge capacity at 500th cycle (mAh/g) (capacity maintenance rate (%)) |
| 7.2 | 168 | 156 (93) |
| 10.5 | 240 | 216 (90) |
| 13.5 | 271 | 230 (85) |
| 18.3 | 298 | 238 (80) |
| 18.9 | 305 | 192 (63) |
| C (Comparative Example) | 156 | 147 (94) |

As clearly shown in the table, the battery configured with the anode of the carbon having a nitrogen content of 18.9 wt % has the largest initial discharge capacity. The charge-discharge performance, which is one of the important characteristics of the secondary battery, is superior in the batteries in accordance with the present invention configured with the carbon material having an nitrogen content of 10.5–18.3 wt % to the other batteries. It was also revealed that, at the 500th cycle, the batteries demonstrated a larger capacity than that of the battery configured with the carbon material having a nitrogen content of 18.9 wt %, not to mention of the battery configured with the carbon material having a nitrogen content of 7.2 wt %.

As apparent from the above-mentioned results, even if Na is used as the alkali metal to be absorbed or intercalated in the anode by charging, the electrode configured with the carbon material containing nitrogen in a range of 10.5–18.3 wt % gives an excellent anode for a non-aqueous electrolyte secondary battery.

Although the description is limited to the anode configured with the carbon material synthesized from polyacrylonitrile and chlorine of Example 9 as the starting material, it is confirmed that a similar advantage is obtained with any anodes shown in Example 7 and Example 8 in a non-aqueous electrolyte secondary battery, when Na is employed as the alkali metal for the anode.

In Example 7 through Example 9, the description has exclusively been made on the anodes configured with the carbon materials synthesized by employing the starting material of aniline, polyaniline, triazine, pyrazine, piperazine, pyrrole, polypyrrole, acetonitrile or polyacrylonitrile. However, it is confirmed that a substantially similar advantage is obtained with any anodes configured with the carbon materials synthesized from any starting material of a heterocyclic compound containing one or more nitrogen atoms such as triazole, pyrazole or melamine, or a chain compound containing one or more nitrogen atoms such as dimethyl formamide, or a chain nitrile represented by acrylonitrile, propionitrile, butyronitrile or pentanonitrile, or derivatives thereof.

EXAMPLE 10

In this example, each of carbon materials each containing at least two members of sulfur, oxygen and nitrogen was synthesized in a reaction vessel by heating two or three starting materials selected from the group consisting of pyrrole containing a nitrogen atom, or thiophene containing a sulfur atom and furan containing an oxygen atom, together with chlorine, and its characteristic as an anode was investigated.

After evacuating a reaction vessel of a quartz tube, its inside pressure was returned to atmospheric pressure with nitrogen, and then each of the starting materials of various proportions was introduced into the reaction tube at a temperature listed in Table 50 below to synthesize each of the carbon materials containing nitrogen and/or sulfur and/or oxygen at various proportions as listed in Table 50 below. In this process, pyrrole, thiophene and furan were vaporized by heating and the resultant vaporized gases were introduced into the reaction tube by using nitrogen as the carrier gas.

TABLE 50

| Reaction | Content (wt %) | | | Supply Amount (mole/hour) | | | |
|---|---|---|---|---|---|---|---|
| tempera-ture (°C.) | sul-fur | oxy-gen | nitro-gen | thio-phene | furan | pyr-role | chlorine |
| 1000 | 9 | 7 | 11 | 0.30 | 0.25 | 0.10 | 0.3 |
| 1000 |  | 7 | 13 |  | 0.35 | 0.10 | 0.2 |
| 1000 | 8 |  | 12 | 0.528 |  | 0.11 | 0.2 |
| 900 | 8 | 8 |  | 0.3 | 0.225 |  | 0.2 |

By employing each of the synthesized carbon materials, an anode was prepared and a battery was configured with the thus prepared anode in a manner similar to that of Example 1, and the capacity and the charge-discharge performance were investigated.

Charge-discharge cycles were repeated for each of the batteries by charging it at a constant current of 0.5 mA/cm$^2$ up to 4.4 V and discharging it as low as 3.0 V. Table 51 below lists the discharge capacity at the first cycle and the discharge capacity at the 500th cycle, as well as the maintenance rate of the discharge capacity at the 500th cycle to the first cycle. In these tables, the discharge capacity represents the capacity for 1 g of the carbon anode containing sulfur.

TABLE 51

| Content (wt %) | | | Discharge Capacity (mAh/g) | |
|---|---|---|---|---|
| | | | | At 500th cycle |
| sul-fur | oxy-gen | nitro-gen | At first cycle | (capacity main-tenance rate) (%) |
| 9 | 7 | 11 | 332 | 249 (75) |
|  | 7 | 13 | 325 | 267 (82) |
| 8 |  | 12 | 322 | 267 (83) |
| 8 | 8 |  | 310 | 248 (80) |

As clearly shown in these tables, in each of the batteries of this example, the initial discharge capacity and the discharge capacity at 500th cycle are larger and more excellent than those of the battery configured with the anode of pyrolyzed carbon obtained from benzene.

As clearly seen from the above-mentioned results, the carbon material containing at least two members of sulfur, oxygen and nitrogen can give an excellent anode, similar to the carbon material containing a single member of sulfur, oxygen or nitrogen.

Moreover, although the description is limited to a battery of cylindrical shape in the foregoing examples, the present invention is not limited to this structure of the battery and a similar advantage is obtained with a secondary battery of a coin type, a rectangular type, a flat type, and the like.

Although the present invention has been described in terms of the presently preferred embodiments, it is to be understood that such disclosures are not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising a cathode capable of being charged and discharged, a non-aqueous electrolyte, and an anode capable of being charged and discharged, wherein said anode comprises a carbon material containing at least one of 7–35 wt % sulfur and 10.5–18.3 wt % nitrogen, provided that if said carbon material contains two of these elements, the total amount of the elements does not exceed 35 wt %.

2. A non-aqueous electrolyte secondary battery in accordance with claim 1, wherein said carbon material contains sulfur and the sulfur content of said carbon material is in a range of 10–35 wt %.

3. A non-aqueous electrolyte secondary battery in accordance with claim 1, wherein said carbon material contains nitrogen and the nitrogen content of said carbon material is in a range of 13.5–18.3 wt %.

4. A non-aqueous electrolyte secondary battery in accordance with claim 1, wherein said carbon material further contains 6.5–25 wt % oxygen, and the total amount of said oxygen, sulfur and nitrogen contained in said carbon material does not exceed 35 wt %.

5. A non-aqueous electrolyte secondary battery comprising a cathode capable of being charged and discharged, a non-aqueous electrolyte, and an anode capable of being charged and discharged, wherein said anode comprises the carbon residue of a thermal decomposition reaction of an organic compound containing at least one of sulfur and nitrogen, said carbon residue containing at least one of 7–35 wt % sulfur and 10.5–18.3 wt % nitrogen, provided that if said carbon residue contains two of these elements, the total amount of the elements does not exceed 35 wt %.

6. A non-aqueous electrolyte secondary battery in accordance with claim 2, wherein said carbon residue contains sulfur and the sulfur content of said carbon residue is in a range of 10–35 wt %.

7. A non-aqueous electrolyte secondary battery in accordance with claim 2, wherein said carbon residue contains nitrogen and the nitrogen content of said carbon residue is in a range of 13.5–18.3 wt %.

8. A non-aqueous electrolyte secondary battery comprising a cathode capable of being charged and discharged, a non-aqueous electrolyte, and an anode capable of being charged and discharged, wherein said anode comprises a carbon material that contains 6.5–25 wt % oxygen and that is essentially free of phosphorus.

9. A non-aqueous electrolyte secondary battery in accordance with claim 8, wherein said carbon material further contains at least one of 7–35 wt % sulfur and 10.5–18.3 wt % nitrogen, and the total amount of said oxygen, sulfur and nitrogen contained in said carbon material does not exceed 35 wt %.

10. A non-aqueous electrolyte secondary battery in accordance with claim 8, wherein the oxygen content of said carbon material is in a range of 10–25 wt %.

11. A non-aqueous electrolyte secondary battery comprising a cathode capable of being charged and discharged, a non-aqueous electrolyte, and an anode capable of being charged and discharged, wherein said anode comprises the carbon residue of a thermal decomposition reaction of an organic compound that contains oxygen and that is essentially free of phosphorus, said carbon residue containing 6.5–25 wt % oxygen.

12. A non-aqueous electrolyte secondary battery in accordance with claim 11, wherein the oxygen content of said carbon residue is in a range of 10–25 wt %.

13. A method for producing an anode material for a non-aqueous electrolyte secondary battery comprising the step of heating an organic compound containing at least one member selected from the group consisting of sulfur, oxygen and nitrogen, together with at least one member selected from the group consisting of a metal halide and halogen in an inert atmosphere at 500°–1,400° C., thereby to obtain a carbon material containing at least one member selected from the group consisting of sulfur, oxygen and nitrogen.

14. A method for producing an anode material for a non-aqueous electrolyte secondary battery in accordance with claim 13, wherein said halogen is chlorine.

15. A method for producing an anode material for a non-aqueous electrolyte secondary battery in accordance with claim 13, wherein said metal halide is a compound selected from the group consisting of cupric or cuprous chloride, ferric or ferrous chloride, nickel chloride or palladium chloride.

16. A method for producing an anode material for a non-aqueous electrolyte secondary battery in accordance with claim 13, wherein said organic compound containing sulfur is a compound selected from the group consisting of a cyclic compound containing one or more sulfur atoms, a chain compound containing one or more sulfur atoms, derivatives thereof, and polymers thereof.

17. A method for producing an anode material for a non-aqueous electrolyte secondary battery in accordance with claim 16, wherein said cyclic compound containing one or more sulfur atoms is a heterocyclic compound containing one or more sulfur atoms.

18. A method for producing an anode material for a non-aqueous electrolyte secondary battery in accordance with claim 17, wherein said heterocyclic compound is one member selected from the group consisting of thiophene, dithian, polythiophene, derivatives thereof and polymers thereof.

19. A method for producing an anode material for a non-aqueous electrolyte secondary battery in accordance with claim 16, wherein said chain compound is one member selected from the group consisting of methane thiol, ethane thiol, dimethyl sulfide, derivatives thereof and polymers thereof.

20. A method for producing an anode material for a non-aqueous electrolyte secondary battery in accordance with claim 13, wherein said organic compound containing one or more oxygen atoms is one member selected from the group consisting of a cyclic compound containing one or more oxygen atoms, a chain compound containing one or more oxygen atoms, derivatives thereof, and polymers thereof.

21. A method for producing an anode material for a non-aqueous electrolyte secondary battery in accordance with claim 20, wherein said cyclic compound containing one or more oxygen atoms is a heterocyclic compound containing one or more oxygen atoms.

22. A method for producing an anode material for a non-aqueous electrolyte secondary battery in accordance with claim 21, wherein said heterocyclic compound is one member selected from the group consisting of furan, pyran, dioxane, derivatives thereof and polymers thereof.

23. A method for producing an anode material for a non-aqueous electrolyte secondary battery in accordance with claim 16, wherein said chain compound is one member selected from the group consisting of polyethylene oxide and polyvinyl alcohol.

24. A method for producing an anode material for a non-aqueous electrolyte secondary battery in accordance with claim 13, wherein said organic compound containing one or more nitrogen atoms is one member selected from the group consisting of a cyclic compound containing one or more nitrogen atoms, a chain compound containing one or more nitrogen atoms, derivatives thereof, and polymers thereof.

25. A method for producing an anode material for a non-aqueous electrolyte secondary battery in accordance with claim 24, wherein said cyclic compound containing one or more nitrogen atoms is a heterocyclic compound containing one or more nitrogen atoms.

26. A method for producing an anode material for a non-aqueous electrolyte secondary battery in accordance with claim 25, wherein said heterocyclic compound is one member selected from the group consisting of pyrrole, piperazine, pyrazine, triazine, derivatives thereof and polymers thereof.

27. A method for producing an anode material for a non-aqueous electrolyte secondary battery in accordance with claim 25, wherein said chain compound containing one or more nitrogen atoms is one member selected from the group consisting of aniline, derivatives thereof and polymers thereof.

28. A method for producing an anode material for a non-aqueous electrolyte secondary battery in accordance with claim 24, wherein said chain compound is one member selected from the group consisting of a chain nitrile, derivatives thereof and polymers thereof.

29. A method for producing an anode material for a non-aqueous electrolyte secondary battery in accordance with claim 28, wherein said chain nitrile is one member selected from the group consisting of acetonitrile and polyacrylonitrile.

* * * * *